US006674538B2

(12) United States Patent
Takahashi

(10) Patent No.: US 6,674,538 B2
(45) Date of Patent: Jan. 6, 2004

(54) IMAGE REPRODUCTION SYSTEM FOR REPRODUCING A STILL IMAGE FROM A VIDEO TAPE

(75) Inventor: Koji Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/175,448

(22) Filed: Oct. 20, 1998

(65) Prior Publication Data

US 2003/0007168 A1 Jan. 9, 2003

Related U.S. Application Data

(62) Division of application No. 07/882,284, filed on May 13, 1992.

(30) Foreign Application Priority Data

May 14, 1991 (JP) .... 3-138397
May 14, 1991 (JP) .... 3-138398
May 14, 1991 (JP) .... 3-138399
May 14, 1991 (JP) .... 3-138400
May 14, 1991 (JP) .... 3-138401

(51) Int. Cl.[7] .... G06F 15/00
(52) U.S. Cl. .... 358/1.15; 358/1.13; 358/1.14
(58) Field of Search .... 358/1.1, 1.5, 1.12, 358/1.13, 1.14, 1.15, 1.16, 401, 403, 444, 443, 452

(56) References Cited

U.S. PATENT DOCUMENTS 4,949,190 A * 8/1990 Thompson .... 358/426
5,032,927 A 7/1991 Watanabe et al.
5,115,320 A * 5/1992 Ebihara et al. .... 358/296
5,172,227 A * 12/1992 Tsai et al. .... 358/426
5,270,832 A * 12/1993 Balkanski .... 358/432
5,291,282 A * 3/1994 Nakagawa et al. .... 348/384
5,336,873 A * 8/1994 Imamura .... 355/40
5,369,463 A * 11/1994 Terashita et al. .... 355/40
5,999,644 A * 12/1999 Sugiura .... 358/500
6,020,982 A * 2/2000 Yamauchi et al. .... 358/444

FOREIGN PATENT DOCUMENTS

JP 59-078348 5/1984
JP 62-101163 5/1987
JP 62-104259 5/1987
JP 01-221989 9/1989
JP 02-014667 1/1990
JP 03-001681 1/1991

* cited by examiner

*Primary Examiner*—Mark Wallerson
(74) *Attorney, Agent, or Firm*—Fitzpatrick, Cella, Harper & Scinto

(57) ABSTRACT

An image reproduction system includes a data bus for transmitting a compressed and coded digital image signal, in which compression mode information related to the compressing and coding of the digital image signal is added to the digital image signal. The system also includes a first input device that inputs the digital image signal transmitted by the data bus and a second input device that inputs an analog image signal. A converter converts the analog image signal inputted by the second input device to a digital signal. A buffer memory selectively stores either the digital image signal inputted by the first input device or the digital signal converted by the converter.

56 Claims, 29 Drawing Sheets

FIG. 7

IMAGE PICKUP & IMAGE COMPRESSION MODE

| IMAGE PICKUP (NUMBER OF SCANNING LINES) / COMPRESSION | | METHOD OF COMPRESSION | | | |
|---|---|---|---|---|---|
| | | NON-COMPRESSION | SUB-SAMPLING | DPCM | JPEG |
| HD | FIELD (562.5 LINES) | MODE 1 | MODE 5 | MODE 9 | MODE 13 |
| | FRAME (1125 LINES) | MODE 2 | MODE 6 | MODE 10 | MODE 14 |
| NTSC | FIELD (262.5 LINES) | MODE 3 | MODE 7 | MODE 11 | MODE 15 |
| | FRAME (525 LINES) | MODE 4 | MODE 8 | MODE 12 | MODE 16 |

FIG. 8

RELATION BETWEEN OF COMPRESSION MODE AND DATA QUANTITY

| MODE | COMPRESSION RATE | DATA QUANTITY (bit) | NUMBER OF STORED PICTURES |
|---|---|---|---|
| MODE 1 | 1/1 | 15M | 2 PICTURE |
| MODE 2 | | 30M | 1 PICTURE |
| MODE 3 | | 3M | 10 PICTURE |
| MODE 4 | | 6M | 5 PICTURE |
| MODE 5 | 1/2 | 7.5M | 4 PICTURE |
| MODE 6 | | 15.0M | 2 PICTURE |
| MODE 7 | | 1.5M | 20 PICTURE |
| MODE 8 | | 3.0M | 10 PICTURE |
| MODE 9 | 1/4 | 3.75M | 8 PICTURE |
| MODE 10 | | 7.5M | 4 PICTURE |
| MODE 11 | | 0.75M | 40 PICTURE |
| MODE 12 | | 1.5M | 20 PICTURE |
| MODE 13 | 1/8 | 1.875M | 16 PICTURE |
| MODE 14 | | 3.75M | 8 PICTURE |
| MODE 15 | | 0.375M | 80 PICTURE |
| MODE 16 | | 0.75M | 40 PICTURE |

| | BIT NO. | 0 | 1 | 2 | 3 | 4 | 5 | 6 | 7 |
|---|---|---|---|---|---|---|---|---|---|
| VTR TO PRINTER | DATA WORD (WD1～WD4) | SORTING GROUP NO. | | ENLARGING/ REDUCING RATE | | NUMBER OF PRINTING-OUT | | | |
| | MANAGEMENT WORD (WD0) | PRESENCE OR ABSENCE OF PARENT | PRINT FINISHED OR NOT | FIELD OR FRAME | PRINTING PICTURE (FRAME) NO. | | | | |
| PRINTER TO VTR | DATA WORD (WD1～WD4) | SORTING GROUP NO. | | ENLARGING/ REDUCING RATE | | NUMBER OF PRINTING-OUT | | | |
| | INFORMATION MANAGEMENT COMMAND (WD0) | READ OR WRITE | DATA STORING AREA DESIGNATION | | IMAGE DATA TRANSFER REQUEST | VTR SEARCH COMMAND | | | |

FIG. 28

| | | | | |
|---|---|---|---|---|
| 01 0012 | 02 0089 | 03 0214 | 04 0431 | 05 0456 |
| 06 0518 | 07 0623 | 08 0727 | 09 0822 | 10 0987 |
| 11 1234 | 12 1432 | 13 1555 | 14 2345 | 15 2468 |
| 16 3456 | 17 3457 | 18 4567 | 19 5676 | 20 5963 |
| 21 7231 | 22 7741 | 23 8123 | 24 8811 | 25 9674 |

IMAGE REPRODUCTION SYSTEM FOR REPRODUCING A STILL IMAGE FROM A VIDEO TAPE

This is a divisional of application Ser. No. 07/882,284, filed May 13, 1992.

BACKGROUND OF THE INVENTION

1. Field of the Invention

The present invention relates to an image reproduction system, and, more particularly to an image reproduction system preferably for use in a video printing system for printing out image information stored on a video tape.

2. Related Background Art

Hitherto, a video printing system 1 arranged as shown in FIG. 9 and capable of printing out an image signal by a video printer 11 thereof has been known, the image signal being supplied from a video camera 10.

The printing-out operation in the video printing system 1 shown in FIG. 9 is performed as follows. First, a picked up image signal is transmitted from video camera 10 to the video printer 11 as an analog signal. The transmitted image signal, that is, a picture signal, is monitored on a display 12. On the other hand, the aforesaid analog signal is converted into a digital signal by an A/D converter 110 in the video printer 11. A desired picture is stored in a field memory 111 at the timing specified by an operation key 116 as a still image. The stored picture is arbitrarily confirmed in such a manner that it is displayed on the display 12 when a switch 115 is switched on by manipulating the key 116. Then, information stored in the field memory 111 is supplied to a printing image unit 114 so as to be printed out by the printing image unit 114.

However, in the conventional video print system 1, it takes about one minute for the video printer 11 to print out one picture and the field memory 111 for only one picture is provided. Therefore, when printing of a plurality of pictures is desired, there is a necessity of waiting for completion of the operation of printing out one picture at the time of searching the next picture from the tape by a searching operation. Therefore, it leads to inconvenience at the time of the operation and a problem arises in that a too long time is required for a user to complete the printing operation.

In a case where a video tape recorder (VTR) for outputting a video signal in the form of a digital signal is connected to the aforesaid video printer, a buffer memory for processing the digital signal must be provided in addition to the aforesaid field memory. Therefore, a problem arises in that the cost cannot be reduced and the overall system cannot be made compact because the circuit becomes too complicated.

In general, in a case where a picture corresponding to a video signal reproduced from a video tape recorder (VTR) is printed out by a printer, a desired picture in the reproduced signal supplied from the VTR is received by a memory in the printer and video data is read out from the memory at a predetermined speed so as to be printed out.

FIG. 18 is a schematic view which illustrates a system of the aforesaid conventional type. Referring to FIG. 18, reference numeral 281 represents a VTR, 282 represents a monitor and 283 represents a video printer. The operation of printing out a desired picture selected from a multiplicity of pictures recorded on a tape will now be described briefly.

First, the VTR 281 is set to a reproduction mode in which the reproduced video signal supplied from the VTR 281 is caused to be supplied to the monitor 282 and the printer 283.

An operator operates the manipulation unit of the printer 283 at the timing when a desired picture is displayed on the monitor 282 while confirming the pictures on the monitor 282. In response to the operation thus performed, a control unit 285 causes a memory unit 284 to store a video signal corresponding to one field (hereinafter called to "one picture") by controlling the memory unit 284. When the memory unit 284 receives the video signals which correspond to the one picture, it reads out the video signals at a predetermined speed which corresponds to the printing speed of a printing unit 286. As a result, a desired picture can be printed out by the printing unit 286.

Hitherto, analog video signals are generally supplied from the VTR 281 to the printer 283.

In a conventional system of the type described above, even if a plurality of pictures on one tape are printed out, the following operation must be repeatedly performed: one picture is selected, and then it is printed out while taking a relatively long time of about one minute for each picture and then the next picture is selected. Therefore, in a case where a multiplicity of pictures are printed out, the operator must operate the system until all of the pictures have been printed out while performing required manipulations.

In a case where there is a desire of again printing out a picture which has been once printed out, it is substantially impossible to again select the same picture. That is, since the VTR records video signals for about 30 to 60 fields per second in a case of, for example, an NTSC, it records pictures of about 430,000 fields on a video tape capable of recording pictures for 120 minutes. Therefore, it is substantially impossible to again retrieve a specific picture from the aforesaid number of pictures.

SUMMARY OF THE INVENTION

An object of the present invention is to provide an image reproduction system capable of completely or independently overcoming the aforesaid problems and an image reproducing device and an image forming device which constitute the aforesaid system.

Another object of the present invention is to provide an image reproduction system capable of easily forming images of a plurality of pictures.

In order to achieve the aforesaid objects, according to one aspect of the invention, there is provided an image reproduction system comprising: detection means for detecting an index signal recorded to a recording medium together with an image signal and specifying a picture to be printed; setting means for setting retrieving conditions for retrieving the picture to be printed; extracting means for extracting an index signal which corresponds to the retrieving conditions thus set; and image forming means for image-forming the picture specified with the extracted index signal.

Another object of the present invention is to provide an image reproduction system which is composed of an image reproducing device and an image forming device and the functions of which are properly allocated to the aforesaid devices.

Another object of the present invention is to provide an image reproduction system capable of quickly retrieving a desired picture from an image forming device.

Another object of the present invention is to provide an image reproduction system capable of transferring a desired picture to an image forming device at high speed.

Another object of the present invention is to provide an image reproduction system having a novel function.

Other and further objects, features and advantages of the invention will be appear more fully from the following description.

BRIEF DESCRIPTION OF THE DRAWINGS

FIG. 7 illustrates an example of a mode which can be set by combining the compression/expansion method of the picture data and the photographing method;

FIG. 8 is a graph which illustrates the relationship between the compression mode and the data quantity;

FIG. 24 illustrates an allocation of data in the data bus;

FIG. 28 illustrates a format of a multiple picture.

DETAILED DESCRIPTION OF PREFERRED EMBODIMENTS

Preferred embodiments of the present invention will now be described with reference to the drawings.

Figure 1:
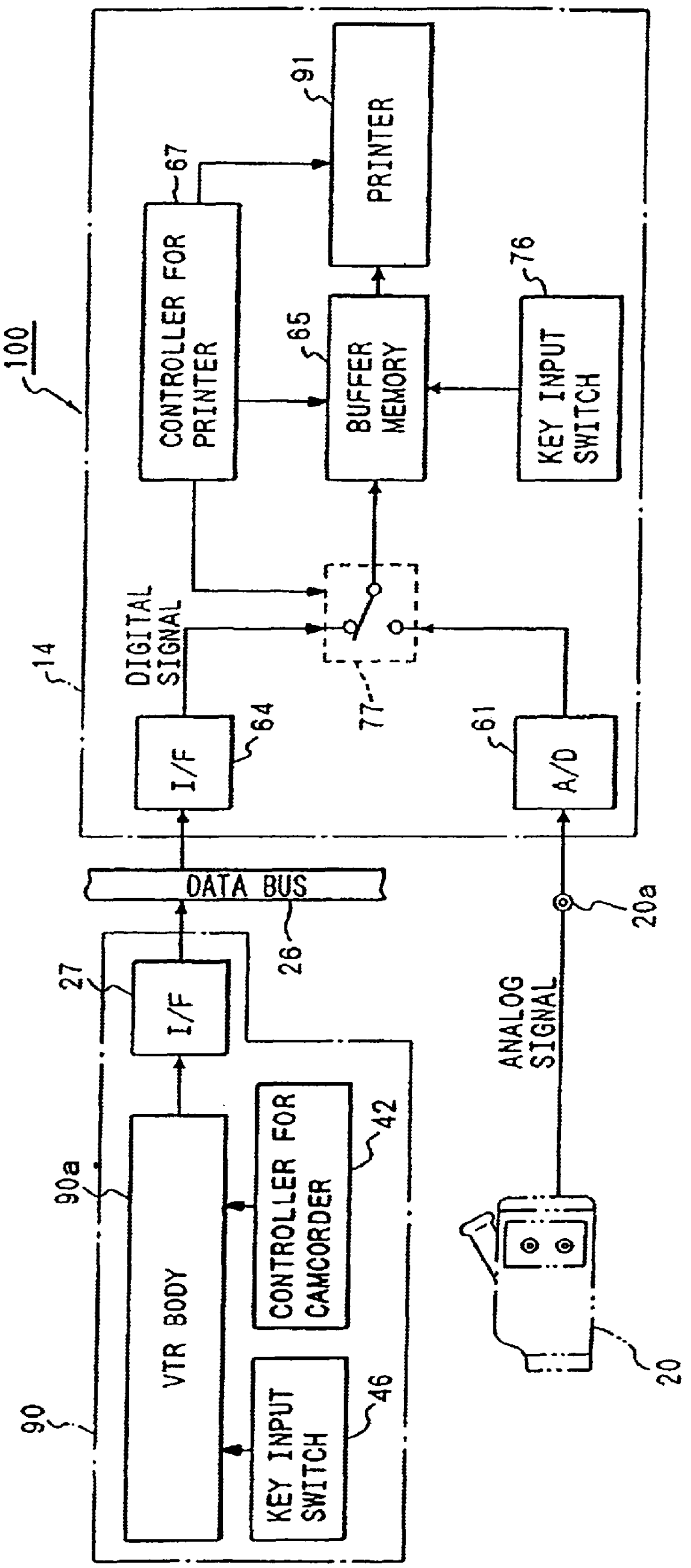
FIG. 1 is a schematic structural view which illustrates an embodiment of a video print system according to the present invention.

FIG. 1 is a schematic structural view which illustrates an embodiment of a video print system 100 according to the present invention.

The system 100 comprises a VTR unit 90, which is an image reproducing device, an analog signal input terminal 20*a* capable of receiving an analog signal supplied from, for example a video camera 20, a video printer unit 14 for receiving a digital signal supplied from the VTR unit 90 via a data bus 26 or an analog signal transmitted from the video camera 20 so as to print out pictures and a data compression/expansion unit 80 to be described later, the video printer unit 14 being an image forming device.

A buffer memory 65 is structured so as to be used commonly when it is properly switched at the time of the operation in such a manner that it serves as a buffer memory for a data bus in a case where it receives the signal in a digital manner under control of a controller 67 for the printer and it serves as a frame memory when a still image is extracted from an analog kinetic image signal at the specified timing made by a key input switch 76.

An analog signal transmitted from video camera 20 is quantized into a digital signal by an A/D converter 61 so as to be transmitted to a terminal of a data selector 77. A printer 91 receives an output signal (image information) from the selector 77 via the buffer memory 65.

The VTR unit 90 comprises a VTR body 90*a*, a key input switch 46 serving as an input unit and a controller 42 for a camcorder serving as a retrieving unit. As a result, print retrieving information about an image to be printed can be recorded by an inputting operation performed with the key input switch 46 when image information is recorded on an 8 mm video tape 41. The digital signal denoting the image to be printed is supplied to another end unit of the data selector 77 via interfaces 27, 64 and the data bus 26.

Figure 4:
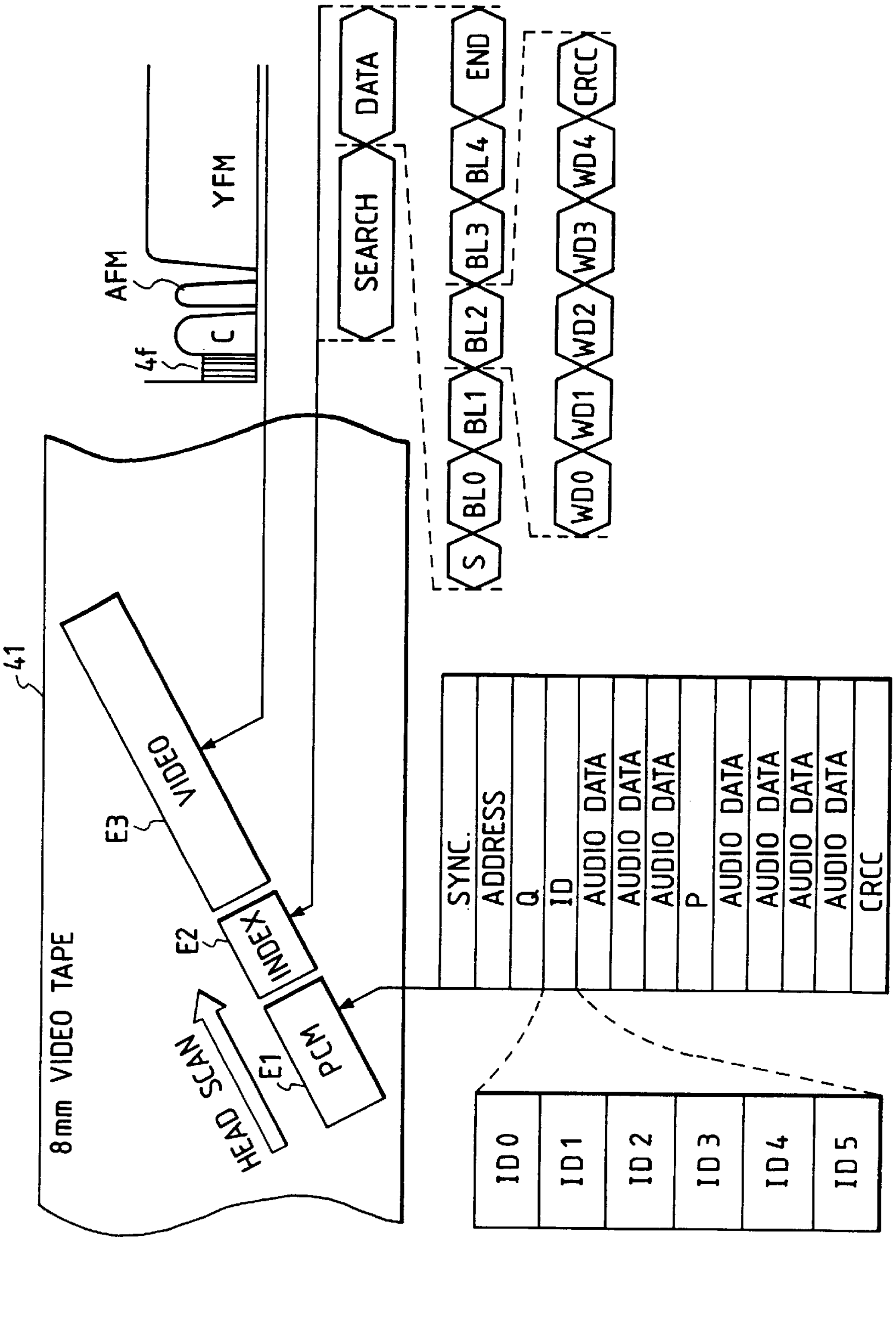
FIG. 4 illustrates a recording track pattern on to an 8 mm video tape.

Then, taking the 8 mm video tape 41 as an example, the way of recording various information items on the tape 41 by the VTR body 90*a* will now be described with reference to FIG. 4 in the forming order of the recording tracks from a lower unit to an upwards diagonal direction. FIG. 4 illustrates the pattern of the recording tracks formed on the tape 41. As shown in FIG. 4, the tape 41 stores the following recorded information items: PCM region E1, INDEX region E2 and VIDEO region E3.

The PCM region E1 is a region in which digital data is recorded at a data rate of 0.5 M to 1.5 Mbps. In the PCM region E1, 8 to 16 bit quantizing stereo audio data, or field/frame digital still image information, and ID words (which consists of ID0 to ID5 and to which the sound quality, and the image quality and date of photography, and the like are recorded) for sub-code information about the aforesaid digital still image information, the sink and the address for re-constituting data, and a PQ parity for detecting an error or a CRCC for correcting an error, and the like are stored.

The INDEX region E2 is a region in which data is recorded by using a technology similar to that used at the time of the PCM recording operation and which is composed of a search signal serving as print retrieving information for retrieving and a data signal. A state where all of data items of the search signal are "0" means a normal state, while a state where all of that are "1" means an input of a head searching signal. Data signal is interposed between S (start block) and END (end block), and 5 blocks composed of data blocks BLO to BL4 are disposed in the data signal. Each block is composed of data words "WDO" to "WD4" and "CRCC". Since each word WD is capable of recording 8 bit data, the number of sheets to be printed out and the like can be set by an outer recording operation of the INDEX region E2.

The frequency spectrum distribution of VIDEO region E3 is arranged in such a manner that 4-frequency pilot signal (4 f) for tape tracking at the time of reproduction is located in the lowest frequency region so that the analog image signal is recorded as brightness FM signal and low frequency conversion color signal and the analog audio signal is recorded as monaural FM signal or a summation and subtraction stereo signal (L+R, L−R) and a sound multiplex (man and sub) FM signal.

Data can be independently recorded/reproduced to and from the aforesaid information regions E1 to E3. For example, a digital still image can be additionally recorded to the tape on which only analog information has been recorded or PCM sound can be recorded afterwards. Furthermore, a specification of a head searching signal for specifying a picture for the printing operation, or that of the size of the sheet to be printed, or that the number of the sheets to be printed can be given to the tape 41 which has been photographed or edited.

Figures 2, 2A:
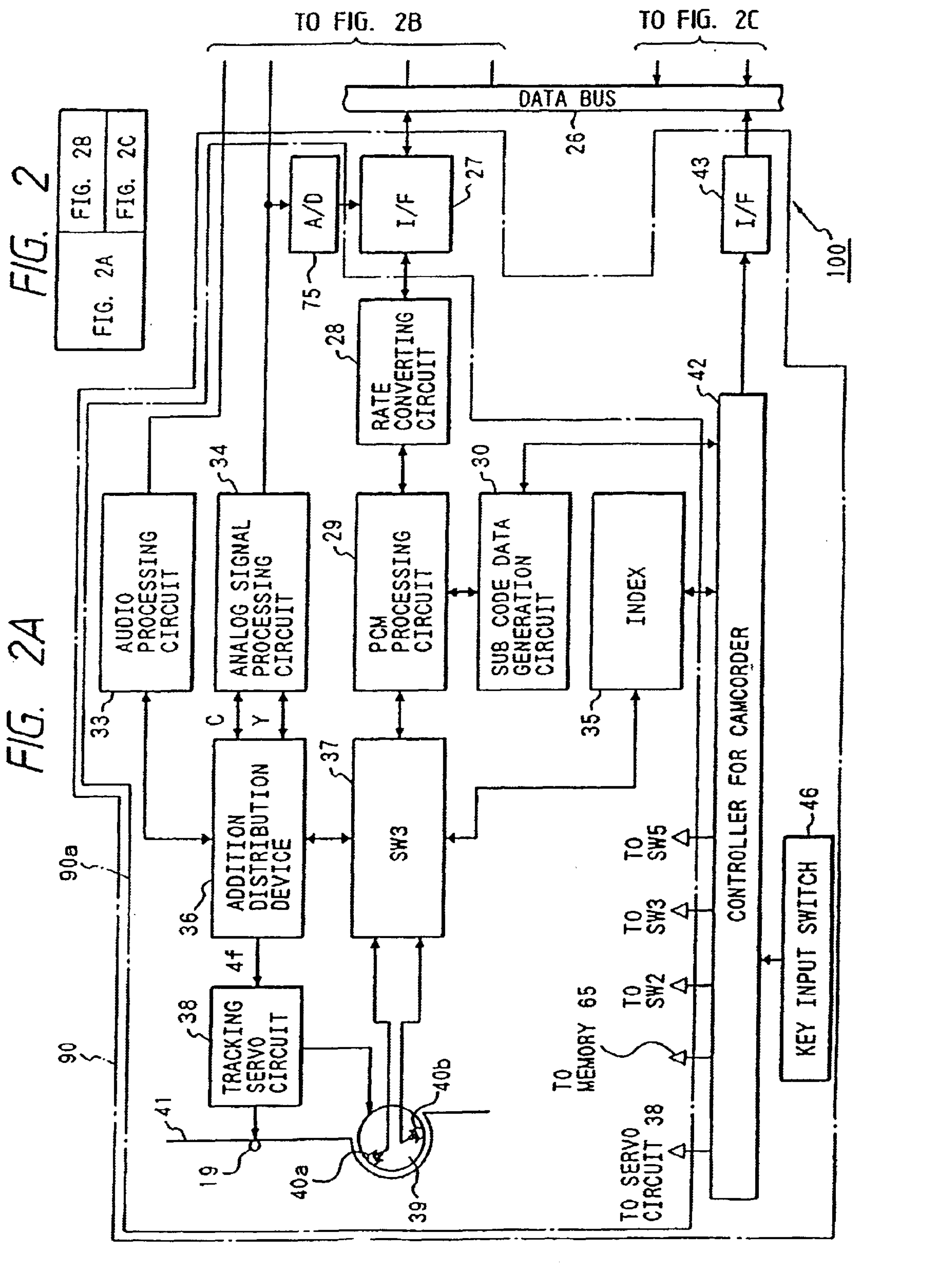
FIG. 2, which is comprised of FIGS 2A–2C is a schematic structural view which illustrates the video print system according to the embodiment of the present invention in a state where information is being reproduced.
Figure 2B:
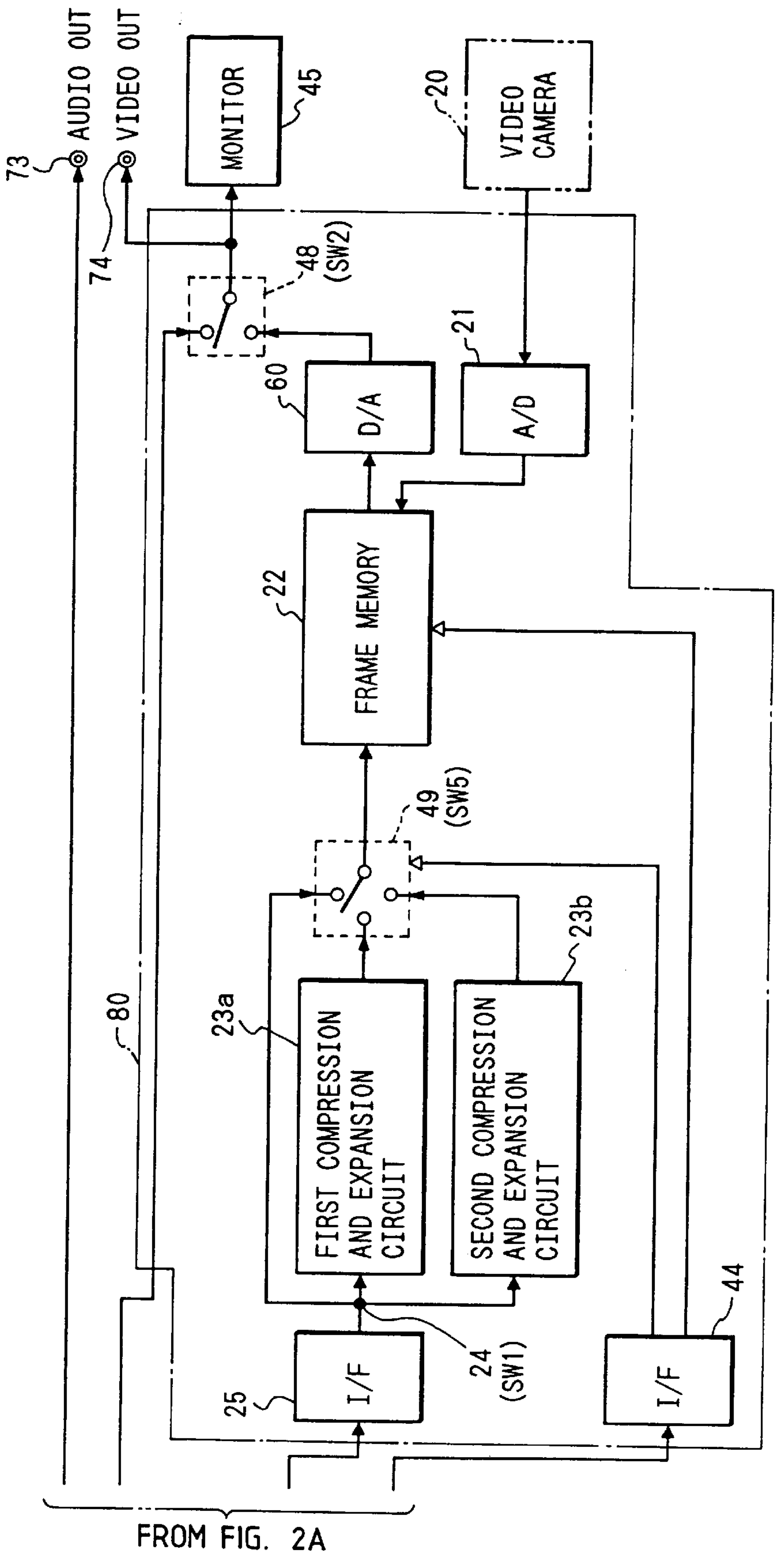
Figure 2C:
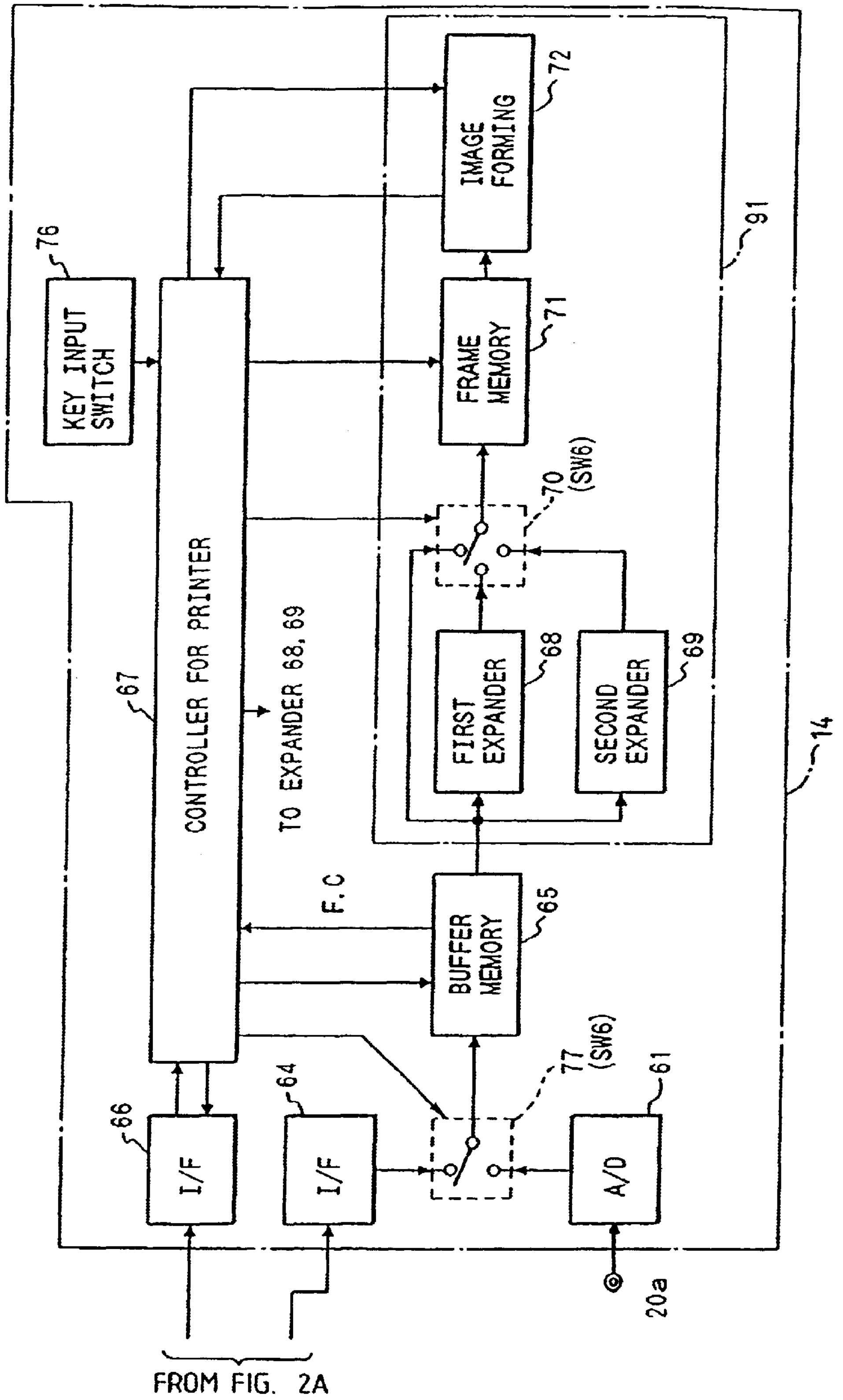
Figure 3:
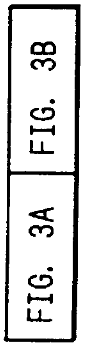
FIG. 3, which is comprised of FIGS. 3A and 3B is a schematic structural view which illustrates the video print system according to the embodiment of the present invention in a state where information is being recorded.
Figure 3A:
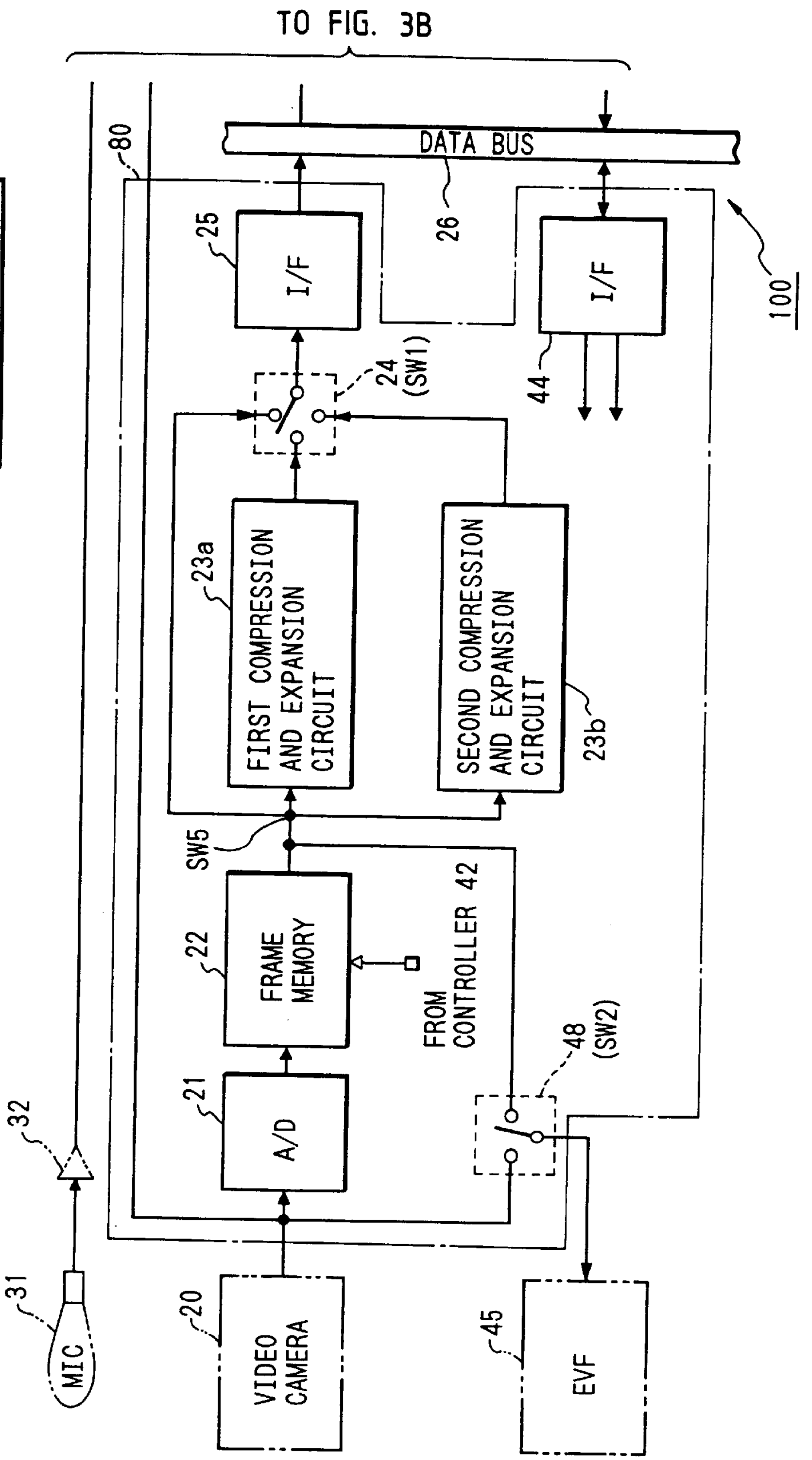
Figure 3B:
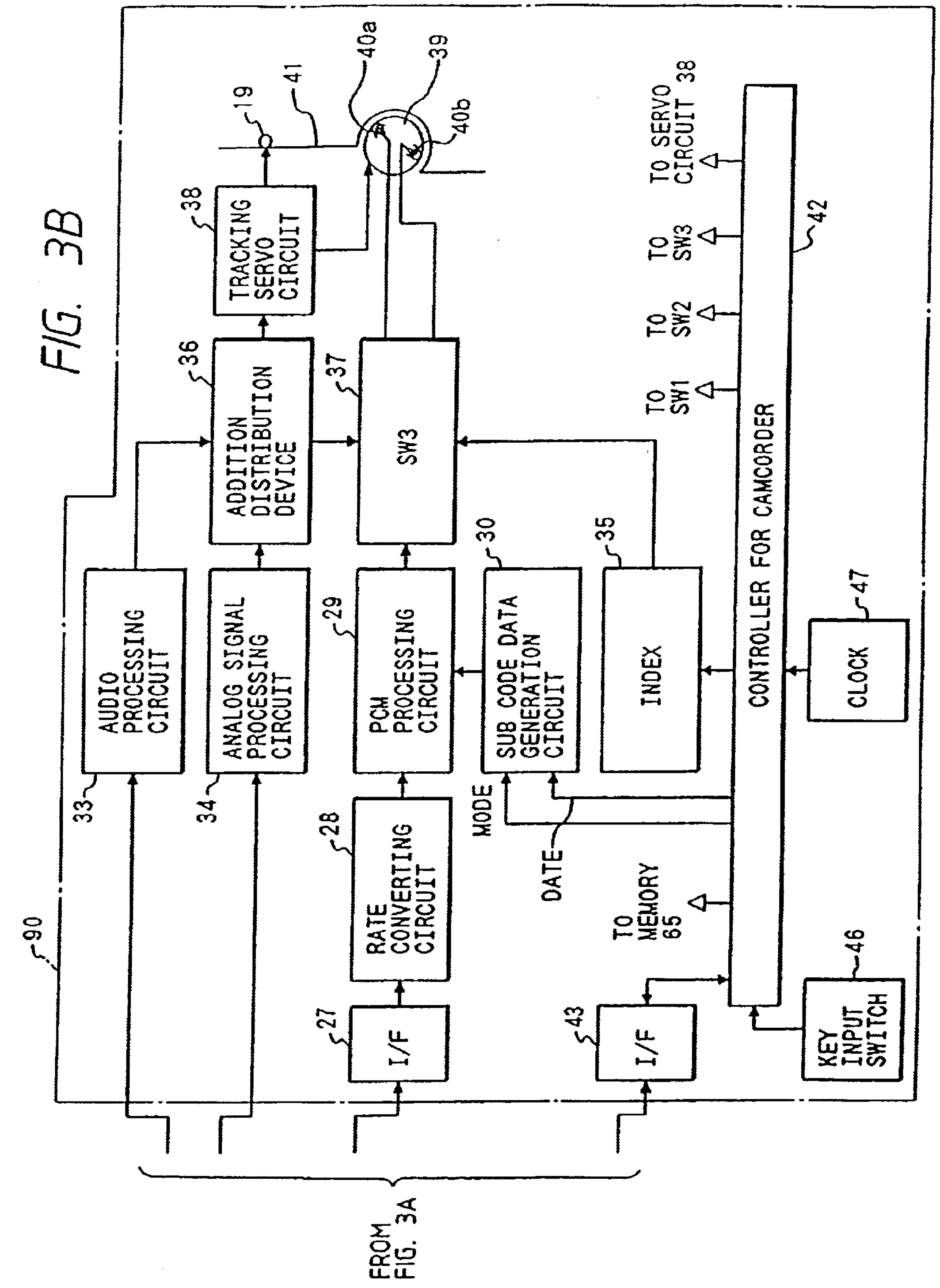

The schematic structure of each unit of this system 100 will now be described with reference to FIG. 2 which is a schematic structural view illustrating information reproducing process performed by this system 100.

The aforesaid data compression/expansion unit 80 comprises an A/D converter 21, a D/A converter 60, a frame memory for storing a digital image signal, a first and second compression/expansion circuits 23*a* and 23*b* for compressing/expanding the digital image signal, a mode selection switch (SW1) 24, a switch (SW5) 49, a switch (SW2) 48 capable of selecting the image signal or still image information and interfaces (I/F) 24 and 44.

The VTR body 90A of the aforesaid VTR unit 90 comprises an audio processing circuit 33 for subjecting supplied audio signal to a predetermined process, an analog signal processing circuit 34 for subjecting the supplied image signal to a predetermined process, a tracking servo circuit 38 for transmitting the 4-frequency pilot signal (4 f), an addition distributing device 36, a rate converting circuit 28 for converting image data into a predetermined data rate, a sub-code data generating circuit 30 for generating mode information, and date information, and the like as ID words of PCM data, a PCM processing circuit 29 for writing mode information or the like supplied from the aforesaid sub-code data generating circuit 30 together with still image data (SV data) to the PCM region E1, time-division signal distributing device (SW3) 37 for sequentially supplying the information items to heads 40*a* and 40*b* disposed on a recording rotational drum 39 at the time of the recording mode in order to form the track pattern as shown in FIG. 4 on the tape 41, the time-division signal distributing device (SW3) 37 distributing the information items in a time-sequential manner at the time of the reproduction mode according to the contents of information. The VTR body 90*a* further comprises an index information generating circuit (INDEX) 35 and an A/D converter 75.

The aforesaid circuits 27 to 36 have both of the recording and reproducing functions and act inversely in the reproduction mode and the recording mode.

The video printer 14 comprises a buffer memory 65 for storing an image signal supplied through the analog image signal input terminal 20*a* via the A/D converter 61 and the data selector (SW6) 77 or an image signal supplied through the interface (I/F) 64, the image signal being stored as a still image. The video printer 14 further comprises first and second expanders 68 and 69 for expanding still image data stored in the buffer memory 65 in a contrary manner to that at the time of the recording operation and a frame memory 71 for storing expanded image data via a selector (SW6) 70 as a still image information to be reproduced and a printing unit 72 for generating a video printed image by using the aforesaid still image information stored in the frame memory 71. The video printer 14 further comprises a printer controller 67 for controlling the each unit of the video printer 14 in accordance with control data supplied via the interface (I/F) 66 and an input signal for selectively operating the selector (SW6) 70 supplied from the key input switch 76. The first and second expanders 68, 69, the selector (SW6) 70, the frame memory 71 and the printing unit 72 constitute a printer 91. The aforesaid buffer memory 65 acts to supply information about the vacant capacity of the buffer memory 65 to the printer controller 67. The printer controller 67 controls the state of occupancy of the buffer memory 65 due to the storage of data in accordance with information about the vacant capacity supplied from the buffer memory 65.

The thus structured operation of the video printing system 100 according to this embodiment will now be described with reference to the drawing.

First, an operation to be performed at the time of recording information will now be described. At the time of the recording operation, the VTR unit 90 is connected to, for example, a video camera. An image signal photographed by the video camera 20 is processed by the analog signal processing circuit 34 in a known manner for the 8 mm video taper recorder. The audio signal received by a microphone 31 is amplified by an amplifier 32 before it is processed in a known manner for the 8 mm video tape recorder by the audio processing circuit 33. The 4-frequency pilot signal (4 f) supplied from the tracking servo circuit 38 for the known 8 mm video tape recorder is added to the image signal and the audio signal processed in predetermined manners in the circuits 33 and 34 by the adder 36 so that the signal to be recorded to the aforesaid VIDEO region E3 is generated before it is supplied to the time-division signal distributor (SW3) 37. When information such as a calender or a clock or the like for use in a so-called automatic date function possessed by the aforesaid video camera 20 are set by the key input switch 46, the aforesaid information items are supplied to the cam coder controller 42. The INDEX 35 generates information to be recorded to the INDEX region E2 under control of the controller 42 so as to supply it to the time division signal distributor (SW3) 37. In a case where the audio signal is recorded to the PCM region E1, the output from the amplifier 32 is selected by a selection circuit (omitted from illustration) by the operation of the key input switch 46, so that the input signal to be supplied to the PCM processing circuit 29 is selectively switched to a still image information to be described later by the cam coder controller 42.

Since the PCM process for the 8 mm video field is a known technology, its description is omitted here for the purpose of simplifying the description.

The image signal photographed by the video camera 20 is converted into a digital image signal by the A/D converter

21. Timing (shutter release timing) specified by the key input switch 46 or an interval pulse automatically generated is transmitted to the frame memory 22 by the cam code controller 42, so that writing of the digital image signal to the memory 22 is inhibited at the moment writing of a desired image is completed and a still image (SV) is received. The received image can be monitored at need by operating the switch (SW2) 48 on an electronic view finder (EVF) 45 which usually displays kinetic image.

The still image data is supplied to the first image data compressing circuit 23*a* and the second image data compressing circuit 23*b* so as to be supplied to the mode selection circuit switch (SW1) 24 as three types of still image data, that is, non-compressive and raw data items (composed data items 1 and 2). The three types of still image data items are switched by the cam coder controller 42 by the key input switch 46. Selected image data is transmitted to the I/F 25 so as to be transmitted to the data bus 26. On the other hand, the cam coder controller 42 transmits mode information (the difference between the non-compressed data, compressed data items 1 and 2) which has been previously selected to the sub-code data generating circuit 30. The PCM processing circuit 29 writes it as the ID word for PCM data together with date information such as the aforesaid automatic date to the PCM region 1 together with still image data.

The aforesaid image data, which has passed through the data bus 26 and the I/F 26, is converted into data rates of 0.5 to 1.5 Mbps by the rate converting circuit 28, the data rates 0.5 to 1.5 Mbps being the same as that of the PCM audio data. The image data is then subjected to the PCM signal process together with the aforesaid sub-code before it is supplied to the time-division signal distributor (SW3) 37.

The time-division signal distributor (SW3) 37 sequentially selects PCM information, INDEX information and VIDEO information corresponding to the PCM region E1, the INDEX region E2 and the VIDEO region E3 when viewed from the head scanning direction so as to form the recording track pattern as shown in FIG. 4. The selected information is supplied to the heads 40*a* and 40*b* formed on the recording rotational drum 39 so that the track pattern as shown in FIG. 4 is formed on the tape 41.

Then, the process to be performed at the time of reproducing information will now be described with reference to FIG. 2.

An assumption is made that information track as shown in FIG. 4 is formed on the tape 41. While tracking the aforesaid track in such a manner that the capstan 19 and the rotational drum 39 are controlled by the servo circuit 38, the recorded information signal is detected by the heads 40*a* and 40*b* formed on the rotational drum 39. The detected signal is processed by the time-division signal distributor (SW3) 37 in such a manner that each information is distributed to the PCM region E1, the INDEX region E2 and the VIDEO region E3 in a time division manner and according to the contents of information.

Information (the analog signal) in the VIDEO region E3 is divided according to the frequency spectrum by the addition distributor 36 so that the signals are supplied starting from the lower frequency spectrum in such a manner that the pilot signal 4 f is supplied to the servo circuit 38, color information c is supplied to the analog signal processing circuit 34, audio information (AFM) is supplied to the audio processing circuit 38 and brightness information Y is, similarly to color information c, supplied to the analog signal processing circuit 34. As a result, they are subjected to the known 8 mm video signal process. As a result, a satisfactorily tracked image and audio signal are transmitted to the output terminals 73 and 74. The image signal can be selectively displayed at need by the switch (SW2) 48 by the cam coder controller 42 similarly to still image information to be described later. Another example may be employed in which an image process such as a known "picture in picture" process is performed.

Information in the INDEX region E2 is subjected in such a manner that a data group as shown in FIG. 4 is reproduced by the INDEX 35 so as to be supplied to the cam controller 42. The head searching operation for the printing out process is performed by rotating the capstan at a high speed by the aforesaid servo circuit 38 until the search signal (e.g. a signal, all of data items of which are "1") written in the INDEX region E2. When the servo circuit 38 detects the search signal, all of data items of which are "1", it reads print information (information about the number of sheets and the size) set to the VIDEO region E3 so as to transmit it to the cam coder controller 42. The aforesaid data items are transmitted to the data bus 26 via the I/F 43 so as to be received by the video printer unit 14 at need.

Information in the PCM region E1 is processed in such a manner that the still image data, which is the main data, and the ID word, which is the sub-code data, are respectively subjected to the reproduction process by the PCM processing circuit 29. The audio rate (0.5 m to 1.5 Mbps) of the still image data is converted in an opposite manner to that at the time of the recording operation by the rate converting circuit 28 so as to be adapted to the data rate of the data bus 26. The audio rate is then transmitted to the data bus 26 via the I/F 27. At this time, the still image information is transmitted to the video printer unit 14 via the data bus 26 in a state it is compressed together with compression mode information.

The cam coder controller 42 transmits the still image information for the image monitoring operation to the ensuing first and the second compressing/expanding circuits 23*a* and 23*b* via the I/F 25 and transmits the control information to the same via the I/F 44.

The switch (SW5) 49 selects non-compressed information and each information substantially expanded/restored to the original image information by the first or the second expanding process. The selection output signal from the switch (SW5) 49 is stored on the frame memory 22 as a still picture for one picture so as to be read out by the D/A converter 60 at the video rate. Then, it is supplied to the switch 48 as analog image information as described above. If necessary, it is displayed on the image monitor device such as an EVF 45.

Also the analog image signal can be printed out similarly to non-compressed data of the digital still image by converting it into digital data by the A/D converter 75 by inputting a head searching signal or the like to an arbitrary picture of the kinetic image signal so as to specify the still image.

The operation of the video printer unit 14 will now be described.

In a case where the analog image signal is made to be the input source, the aforesaid digital image information, accompanying control data and ordinary image signal supplied through the analog image signal input terminal 20*a* is digitized by the A/D converter 61 before it is supplied to the buffer memory 65 via the data selector (SW6) 77, so that it is stored as a still image.

In a case where the aforesaid digital image signal is made to be the input source, the transmitted image signal has been supplied on the data bus 26 adjacent to the video printer unit 14. Therefore, the video printer unit 14 receives image data of the aforesaid information is into the buffer memory 65 adjacent to the printer unit 14 and the printer controller 67 via the I/F 64 and receives control data to the same via the I/F 66.

The output from the I/F 64 is supplied to the buffer memory 65 via the data selector (SW6) 77. The buffer memory 65 always transmits information about the space capacity of the buffer memory 65 to the printer controller 67 in order to enable the printer controller 67 to control the memory occupancy state due to the storage of data. The first and second expanders 68 and 69 expand image data, which have been temporarily stored, under control of the printer controller 67 in an opposite manner to that performed at the time of the recording operation. The selector (SW6) 70 stores expanded image data together with non-compressed data on the frame memory 71 as still image information to be reproduced. The printing unit 72 is controlled by the printer controller 67 so as to generate a video print picture by using still image information.

The aforesaid data selector (SW6) 70 acts in synchronization with the operation of switching the input signal by means of the key input switch 76, so that the selection operation is properly controlled by the printer controller 67.

Figure 5:
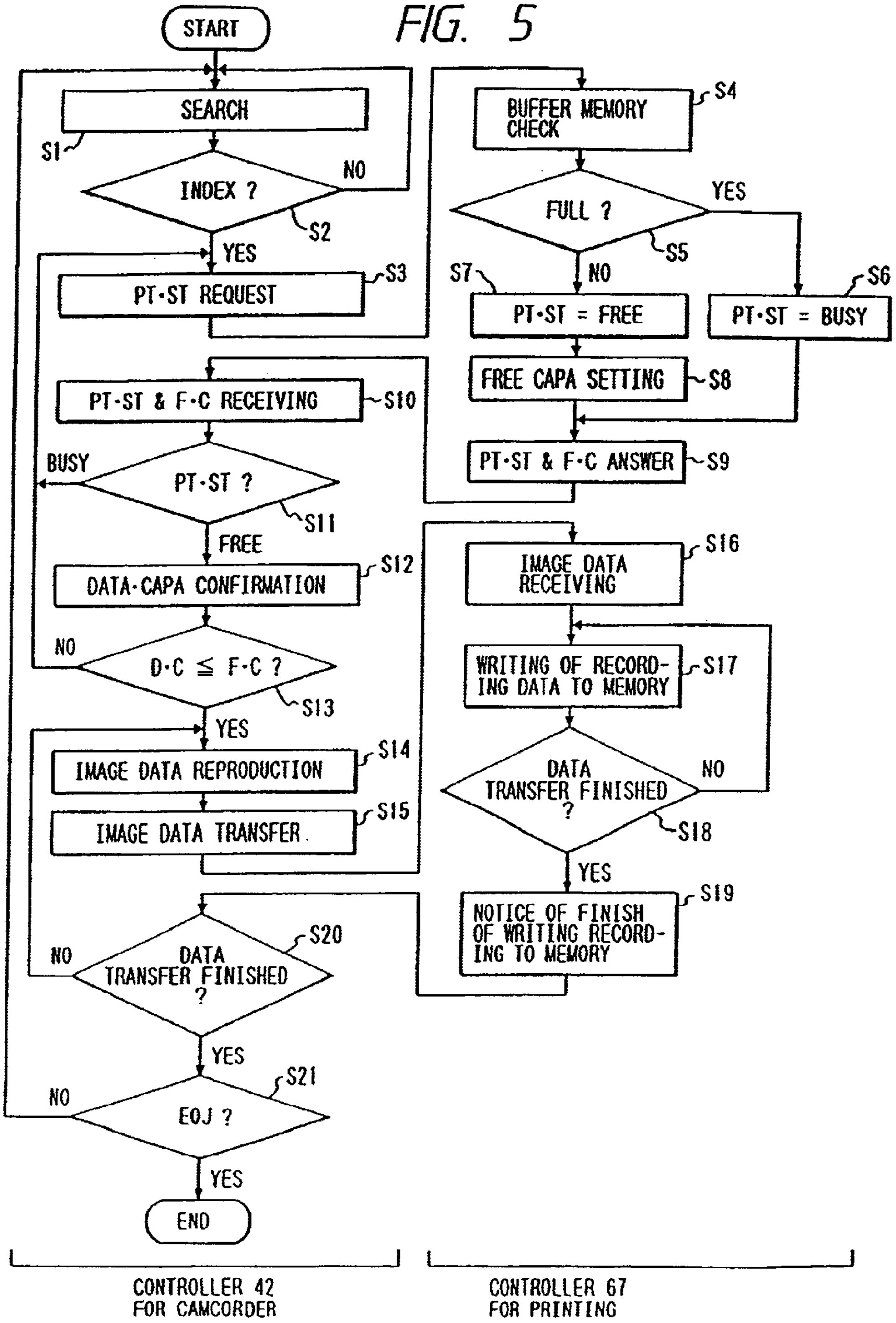
FIG. 5 is a flow chart which illustrates the operation of the video print system according to the embodiment of the present invention.

The automatic printing operation will now be described with reference to an operation flow chart shown in FIG. 5 while centering on the operation of exchanging data between the VTR unit 90 and the video printer unit 14.

When the operation is started, the servo circuit 38 in the VTR unit 90 searches the video tape 41 under control of the cam coder controller 42 (S1). The cam coder controller 42 confirms whether or not the head-searching signal has been detected from the INDEX region E2 (S2) and causes the servo circuit 38 to continue its searching operation until the fact that all of the data items are "1" is detected in the head searching signal. If it is detected, the rotation of the capstan 19 is stopped and the flow proceeds to step S3 on the affirmative side. In this step, the printer controller 67 requests print status "PT·ST" for confirming the operation state of the unit including the printer unit 14. The printer controller 67 in the unit including the printer unit 14 which has received the request transmitted via the data bus 26 confirms the state of the buffer memory 65 (S4). The printer controller 67 receives information about the vacant capacity from the buffer memory 65 so as to confirm that the memory has been saturated (S5). If it has been saturated, the flow proceeds to step S6 in which "PT·ST" is set to "Busy". If there is a vacant capacity, "PT·ST" is set to "Free" (S7) and "Free-Capa" is set according to the state of occupancy of the memory (S8). The printer controller 67 transmits the thus set "PT·ST" information about the state of the printer unit 14 and "Free·Capa (F.C)" information about the vacant capacity of the buffer memory 65 to the data bus 26 so as to be sent to the unit including the VTR unit 90 (S9).

The cam coder controller 42 receives "PT·ST" and "F.C" (S10). If "PT·ST" is "Busy" (S11), returning to said step S3 and waiting till the operation of printer unit 14 becomes idle.

The printer controller 67 confirms the quantity of still image data which corresponds to the head searching signal found in step S2 if there is a vacant capacity in the buffer memory 65 because "PT·ST"="Free", the confirmed data quantity being then set to D·C (data capacity) (S12). The printer controller 67 reads out information about information about the type of the photography and the compression mode and it may specified as shown in FIG. 7 or it may describe the capacity in the sub-code as the number of bits.

Then, the printer controller 67 makes comparisons between D.C and F.C, that is, the vacant capacity of the buffer memory 65 in the printer unit 14 and the quantity of image data to be transmitted from the VTR unit 90 (S13). If the memory in the printer unit 14 does not have a satisfactorily large capacity, the flow returns to step S3 in which the generation of a vacant capacity in the buffer memory 65 is waited for. If an affirmative discrimination is made, image data confirmed in step S12 is reproduced (S14) and image data items are sequentially transmitted to the data bus 26 (S15).

The printer controller 67 receives image data via the I/F 64 (S16) and writes image data to the buffer memory 65 (S17). Then, the printer controller 67 checks data transference (S18) and notifies the VTR portion 90 via the bus line 26 that the completion of the operation of writing image data to the buffer memory 65 if the checking operation has been completed. When the cam coder controller 42 discriminates the completion of the data transference operation from the notified fact (S20), it confirms the existence/presence of the instruction to search the next head searching signal. If there is a left "JOB", the flow returns to step S1 for the searching operation and this operation is performed. If a discrimination of "END of JOB" is made, the flow proceeds to the affirmative side and the process is completed here.

Figure 6:
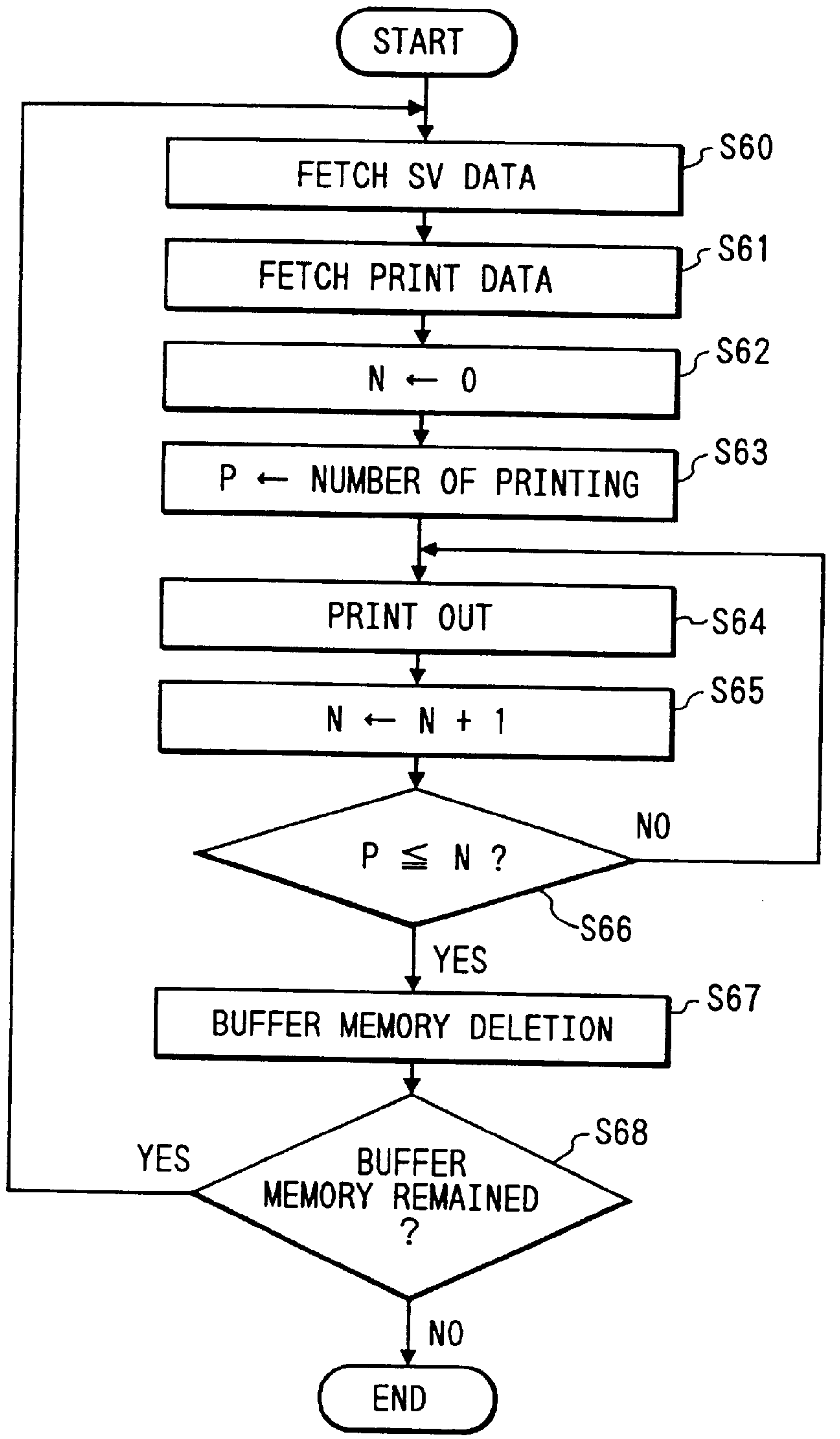
FIG. 6 is a flow chart which illustrates the operation of the video print system according to the embodiment of the present invention.

The operation of the video printer unit 14 will now be described with reference to an operation flow chart shown in FIG. 6.

The printer controller 67 properly expands still image data (expressed as "SV" in the flow chart) supplied from the buffer memory 65 and receives it after the printer controller 67 has developed still image data on the frame memory 71 (S60). The printer side controller 67 receives data about the printing out conditions and the like (the size of the print and the number of prints) (S61). Then, the printer controller 67 resets a print sheet number counter N to "0" (S62). The printer side controller 67 sets the number of the prints received in step S61 to P (S63). Then, the printing operation is commenced and printing of one sheet is printed before the flow proceeds to next step (S64). Then, the count of the counter N is increased by one (S65), and then whether or not the number N of the printed sheets has reached required number P is discriminated (S66). If a negative discrimination is made, the flow returns to step S64 in which the printing out operation is continued. If an affirmative discrimination is made, the flow proceeds to step S66. The original data (compressed data) of still image data is deleted from the buffer memory 65 after the printing out operation has been completed (S67).

After the deletion in the step S67, it is discriminated whether still image data to be printed still remain or not (S68). If such remain, the processing returns to the step S60. When the buffer memory 65 becomes vacant, the processing is completed.

FIG. 7 illustrates examples of modes which can be set by combining the methods of compressing/expanding image data and the image pickup methods. As the image pickup methods, the field and the frame of an NTSC (or PAL) field photographing method and those of a so-called high-vision TV which has doubled frame photographs and the number of scanning lines are set. As the compressing method, a space thinning sub-sample, or a quantizing operation DPCM, or a block coding orthogonal conversion DCT, or a JPEG, or the like can be utilized. FIG. 7 illustrates an example of the aforesaid combinations expressed as 4-bit modes 1 to 16 as the modes.

FIG. 8 illustrates results of calculations of the data quantities which correspond to the aforesaid modes 1 to 16 and the number of pictures stored in the memory while assuming a buffer memory capable of storing non-compression information about an HD frame picture by a quantity of only one picture.

As described above, data for several to several tens still image can be stored in one buffer memory 65 according to the mode.

According to the aforesaid embodiment, an example is described in which the buffer memory 65 is commonly used as the buffer memory for processing the digital signal and the frame memory for processing the analog signal. However, it can be used as a field memory in place of the frame memory.

According to the aforesaid embodiment, when image data is transferred from the VTR unit 90 to the printer unit 14, the operation state of the printer unit 14 can be confirmed and the searching operation to be performed by the VTR unit 90 can be controlled according to the state of the printer. Therefore, by previously recording print retrieval information on the video tape 41, a video printer system capable of performing an automatic printing process by sequentially searching plural types of pictures (immediately after the printing operation has been completed) can be realized.

As described above, the complicated printing process which takes a lot of time can be automated and therefore the home video printing culture can be widely used.

Furthermore, in a case where a development to an external printing laboratory is made in the present photograph DPE system, the automation of the printing process will realize an advantage. Therefore, a novel electronic photography DPE culture can be created in which a video tape, to which printing out information has been inputted, is brought to a printer service shop capable of printing a higher image quality.

Since the data transference to the buffer memory 65 in the printer unit 14 is performed in a compression state, the data transference speed can be raised, the number of pictures which can be stored in the buffer memory 65 can be increased and delay of the operation due to the busy state generated in the operation of the printer unit 14 cannot be easily generated. Therefore, the overall operation time can be shortened.

Since two picture sources, that is, the analog input and the digital input are provided, a variety of input signals can be treated.

According to this embodiment, the memories required for each input section is constituted by the same memory and it is switched to the buffer memory and the frame memory or the field memory in synchronization with the selection of the input signal. Therefore, the size of the circuit can be made to be compact. Furthermore, the memory capacity of the analog signal section can be used by the digital signal section, causing design freedom to be realized. Therefore, the aforesaid problem of time loss due to the delay of the searching operation in the VTR unit 90 caused from the "printer-busy", that is, the full-operation of the buffer memory cannot easily take place. As a result, an effect can be obtained in that the overall printing time can be shortened.

As described above, according to this embodiment, the buffer memory and the frame memory or the field memory are made of the common memory and the common memory is selectively used as the buffer memory and the frame memory or the field memory according to the state of selection of the first input means for receiving the digital signal or the second input means for receiving the analog signal. Therefore, a video printing system can be provided which is capable of satisfactorily shortening the time taken for the user even if a plurality of pictures are printed out, with which the printing operation can be automated, the overall cost of which can be reduced and the structure of the circuit of which can be simplified and made to be compact.

Another embodiment of the present invention will now be described.

An example for automating the printing output operation, which is the characteristics of the present invention will now be described which has two modes including a partial printing mode. Since the structure on the viewpoint of the hardware is the same as the embodiment shown in FIG. 2, only a flow chart which illustrates the procedure of the process will now be described with reference to FIG. 10.

According to this embodiment, a first mode is made to be a full mode in which the overall data in a video cassette is automatically collectively printed and a second mode is made to be a part mode in which the number of prints is specified and the specified part is automatically printed. First, in step S90, an index counter P and an index memory N are reset to zero. In next step S91, branching to a first full mode and a second part mode is made according to the mode which has been set. In a case of the full mode, the tape is rewound to the tape head in step S92, and then the flow proceeds to step S94. In the case of the part mode, the number of the pictures is set in the index memory N in step S93, and then the flow proceeds to step S94.

In step S94, the forward directional index search is performed, and then the flow proceeds to step S95 in which a completion discrimination is made whether or not search has reached the end unit of the tape. If it has not reached the end unit, the process is completed here. If it has reached the end unit (EOT=End Of Tape), whether or not the index has been detected is discriminated in step S96. A loop arranged as S94→S95→S96→S94 is repeated. If it has been detected, the flow proceeds to step S97. In step S97, print information (the number of sheets, the size, and the like) and still image information are read from the tape.

In next step S98, the status (PT·ST) of the printer is confirmed. In a case of Busy, the flow proceeds to step S99 in which temporary waiting is performed and a loop arranged as S98→S99→S98 is repeated until Free is again realized. If Free is realized, data read in step S97 is transmitted to data bus 26 in step S100.

In next step S101, the count of the index counter P is increased by only one, and then whether or not all of the pictures corresponding to a predetermined number N of the indexes have been processed is discriminated. If there is a non-processed picture ($N>P$), the flow returns to step S94. If it has been completed ($N \leqq P$) the flow proceeds to END and the aforesaid sequential process is completed.

Figure 11:
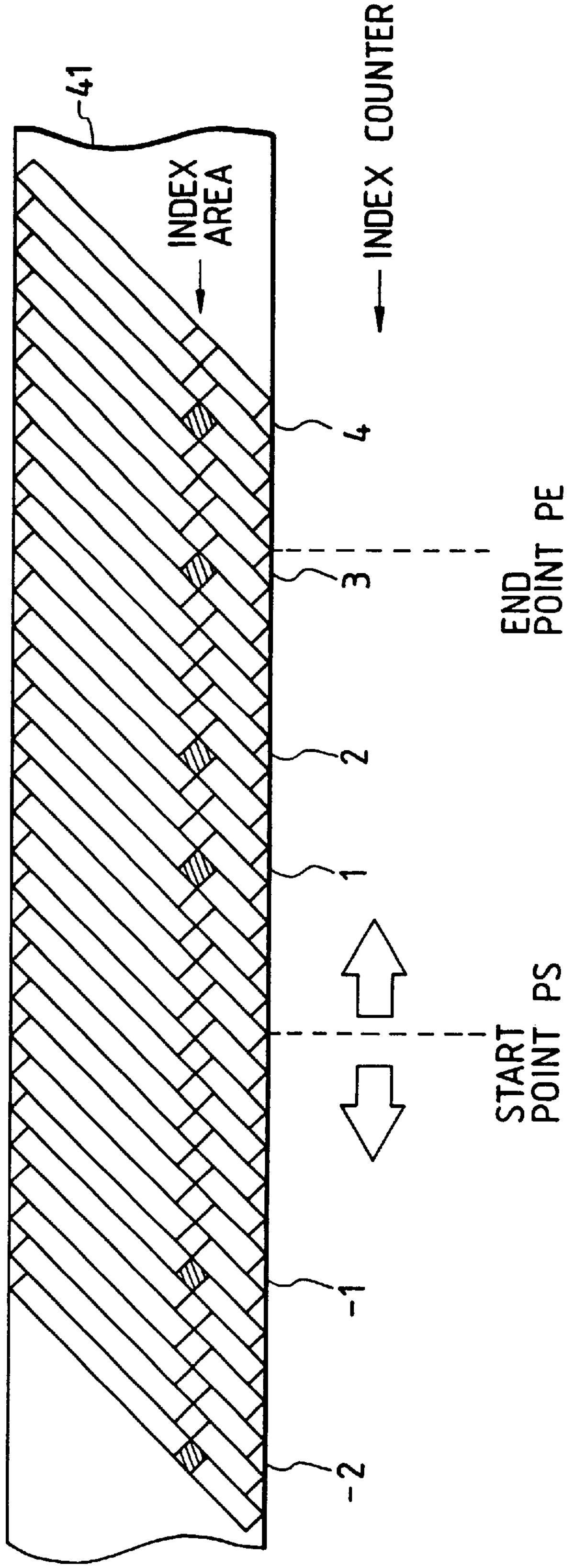
FIG. 11 illustrates an image picture on a tape formed by the operation shown in FIG. 10.

FIG. 11 illustrates an image picture formed in a case where a partial printing is specified by using the index counter.

Assuming that the index counter is set to N=3 with respect to the process start point PS, the tape is sent in the forward direction until the index number 3 is detected. At this time, the tape sending operation is stopped at the end point PE. If N is set to a negative number, the tape sending is started in the opposite direction from the start point PS and therefore the index searching operation is started in the opposite direction. The process is completed when the determined number is realized similarly to the forward direction.

Actually, the same index information is continuously recorded for about 10 seconds, that is, about 600 tracks converted, the configuration becomes different from that shown in FIG. 11.

Figure 10:
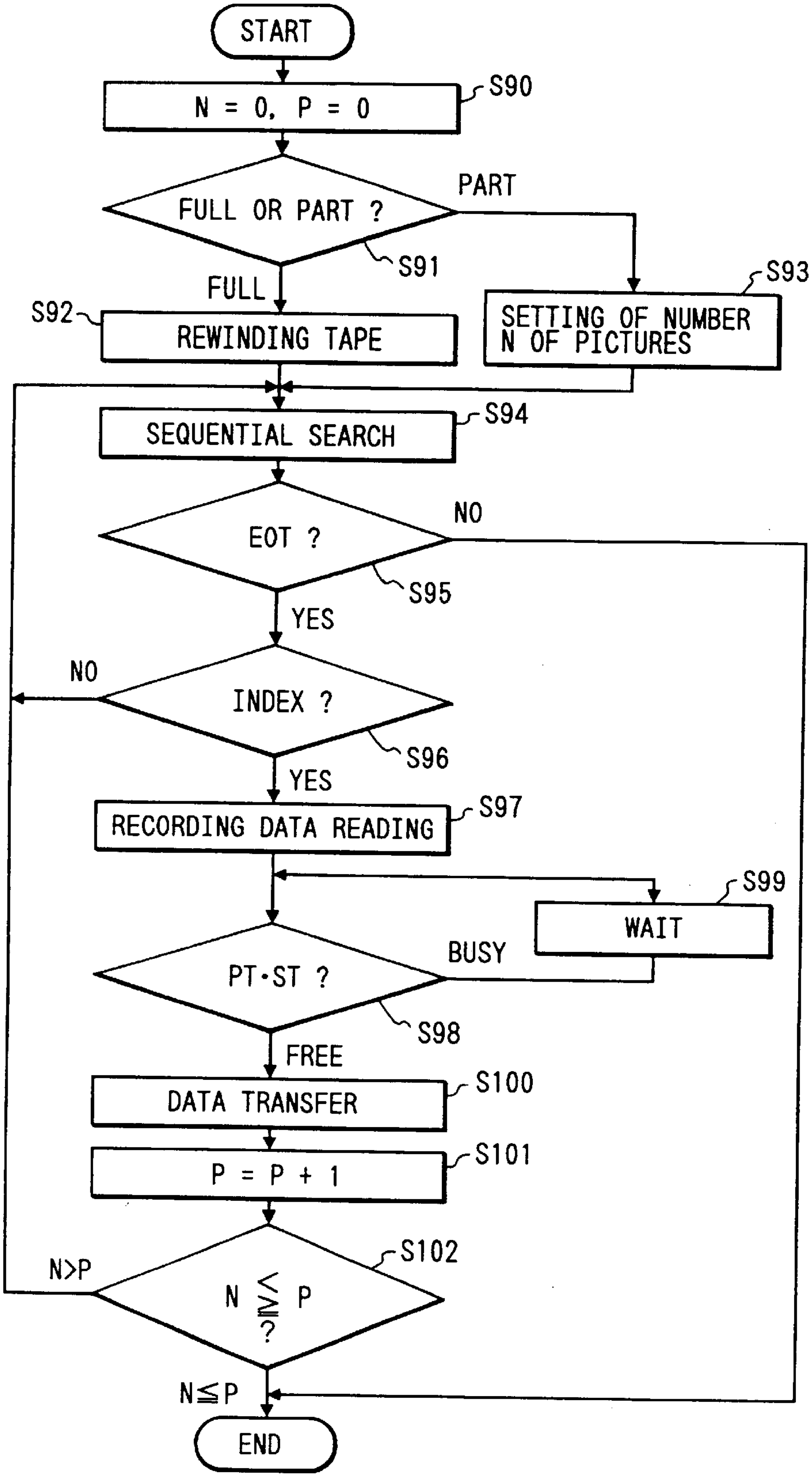
FIG. 10 is a flow chart which illustrates an example of the partial printing operation in the automatic printing process.

According to the automatic printing out process as shown in FIG. 10, a partial image printing can be automatically performed. Therefore, addition of printing out can be enabled if necessary and therefore the use can be varied. As a result, a convenient video printing system can be constituted.

Another example of automating the printing out process having the first full mode and the second part mode similarly to the embodiment shown in FIG. 10 will now be described with reference to a flow chart shown in FIG. 12.

According to this example, the first mode is made to be a full mode for collectively automatically printing all information on a video cassette and the second mode is made to be a part mode for automatically partially printing information while specifying the image pickup period.

First, in step S90, period specification start variable T1, completion variable T2 and a reverse flag Rv are provided and each of them is reset to zero. In next step S91, branching to the first full mode and the second part mode is performed according to the mode which has been set. In the case of the full mode, rewinding to the tape head is performed in step S92, and then the flow proceeds to step S94. In the case of the part mode, the subject periods T1 and T2 are set by the key input operation performed by a user with the key switch 76 or 46. Then, the flow proceeds to step S94.

In step S94, the forward directional index search is performed. Then, in step S95, a completion discrimination whether or not searching has reached the tape end is made in step S95. In step S96, whether or not the index has been detected is discriminated and a loop arranged as S94→S95→S96→S94 is repeated until it is detected. If it is detected, the flow proceeds to step S97. In step S97, a time code (data and time of the photography and the like), print information (the number of sheets or the size or the like) and still image information are read from the tape.

In next step S98, time code "DATE" read in the previous step S97 is subjected to a comparison with variables T1 and T2 so as to confirm whether or not it is information within the subject period for the printing out operation. If $T1 \leqq DATE$ or $T2 \geqq DATE$, an affirmative discrimination is made. Therefore, the data transference is performed in step S99 because it is within the subject period. That is, still image information and the like are transmitted to the data bus 2. If $T1 > DATE$ or $T2 < DATE$, a negative discrimination is made. Therefore, a fact that the reversing of the searching direction has not been performed is confirmed in step S100, and then the searching direction is reversed in step S101. Then, the reverse flag Rv is set to "1" in step S102 and the flow returns to step S94 in which searching is performed. However, in the case where the reverse searching has been started, the process is completed at the moment Rv=1 is detected in step S100 in order to avoid repeated searching of the same tape.

Figure 13:
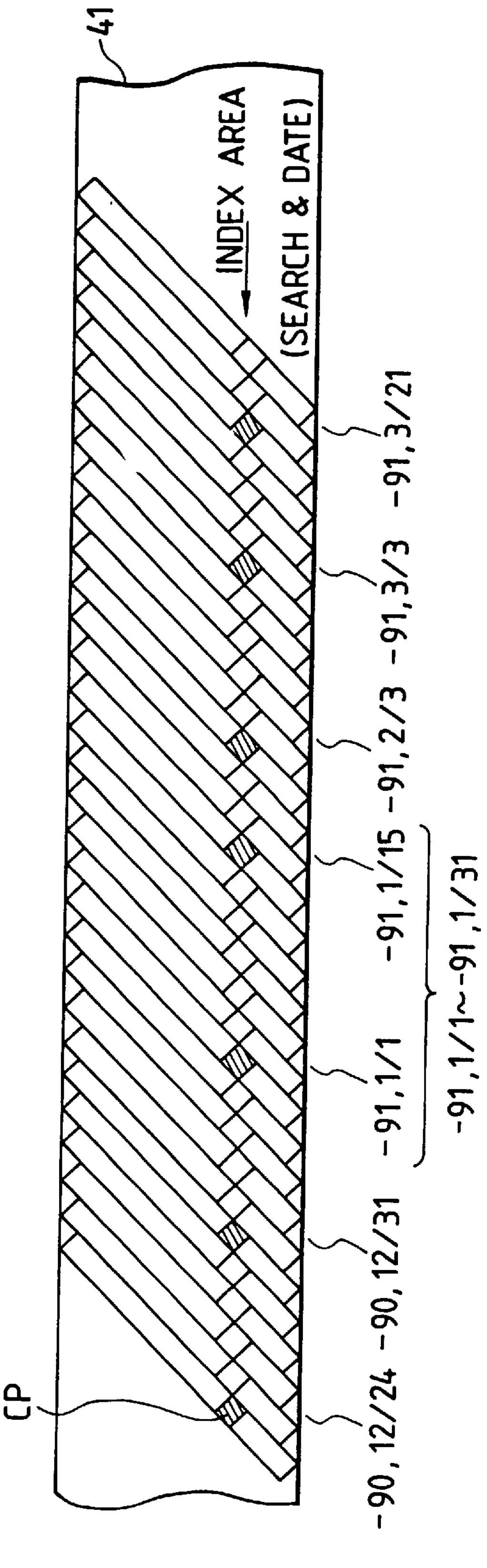
FIG. 13 illustrates an image picture on a tape formed by the operation shown in FIG. 12.
Figure 14:
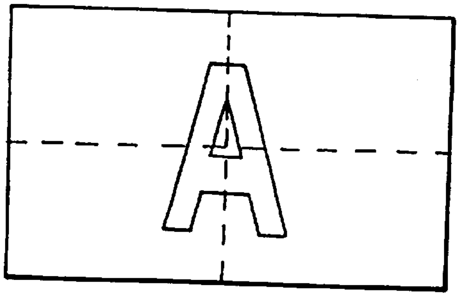
FIG. 14 illustrates a state in which storage to a buffer memory 65 shown in FIG. 2 is made.
Figure 15:
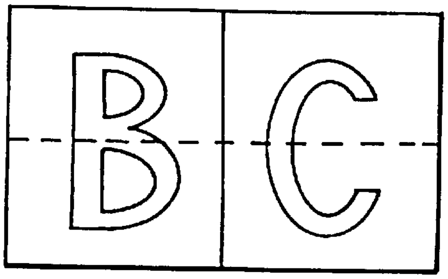
FIG. 15 illustrates a state in which storage to a buffer memory 65 shown in FIG. 2 is made.
Figure 16:
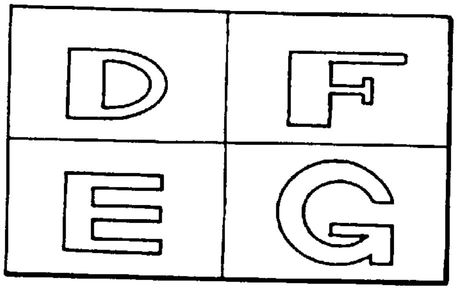
FIG. 16 illustrates a state in which storage to a buffer memory 65 shown in FIG. 2 is made.
Figure 17:
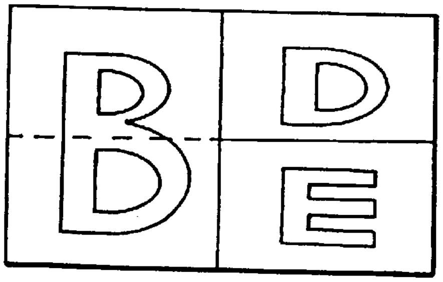
FIG. 17 illustrates a state in which storage to a buffer memory 65 shown in FIG. 2 is made.
Figure 18:
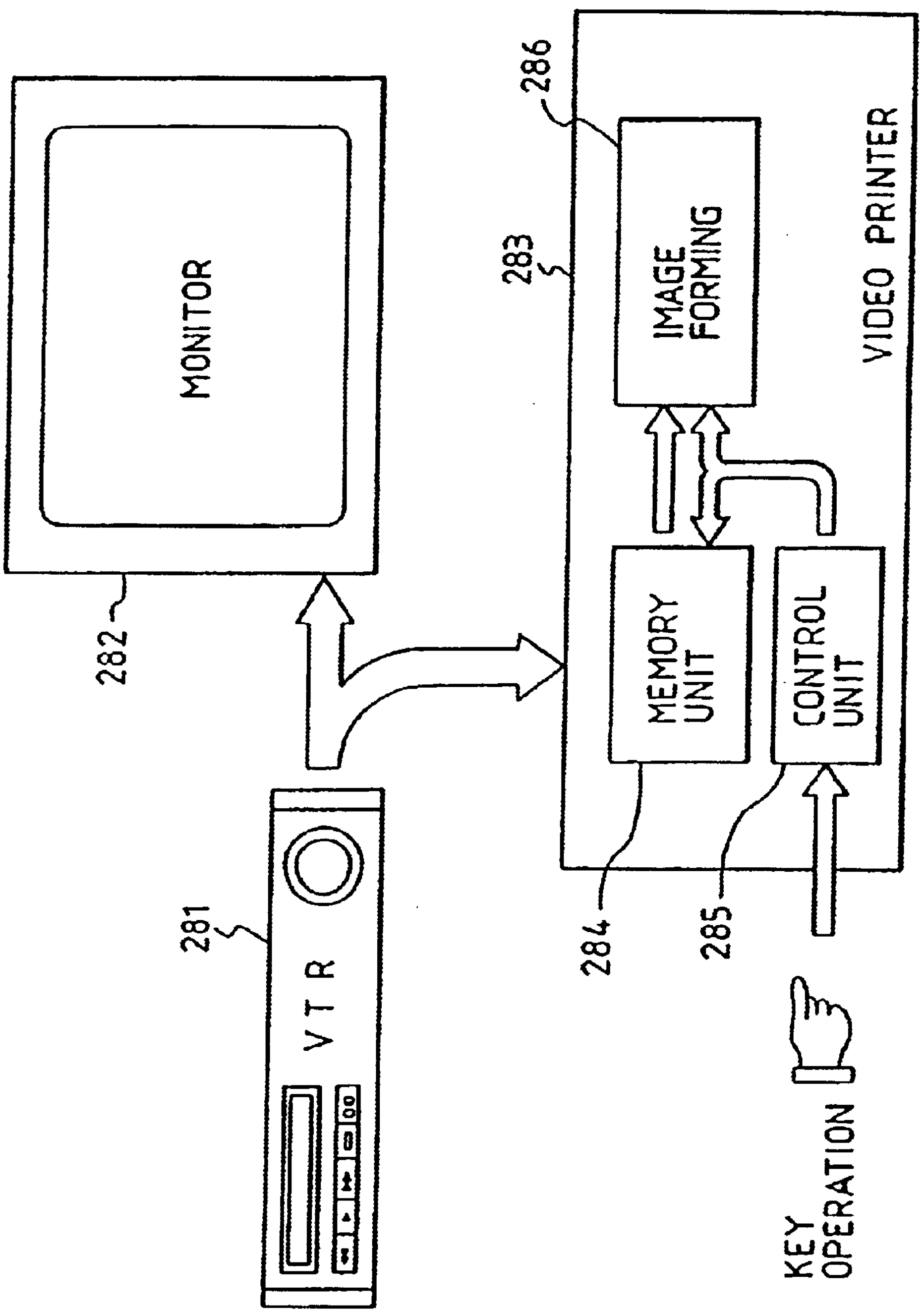
FIG. 18 is a block diagram which illustrates another conventional system.

FIG. 13 illustrates an image picture formed in a case where the time code and the search code are written to the index region.

A unit designated by diagonal lines is a unit to which the search code is written and date entered below it corresponds to the date of the photography. Although, the distance between the marks (CP) is positioned away from each other by several hundred times actually, DATE is written in the time sequential manner. For example, assumptions are made that T1=Jan. 1, 1991 and T2=Jan. 31, 1991, it can be understood that the subject period for the printing output operation defined by T1 and T2 are two pictures on Jan. 1, 1991 and that Jan. 15, 1991. In the aforesaid case in which only specific pictures photographed in January 1991 are desired to be printed, it can be performed by the aforesaid printing out process.

Figure 12:
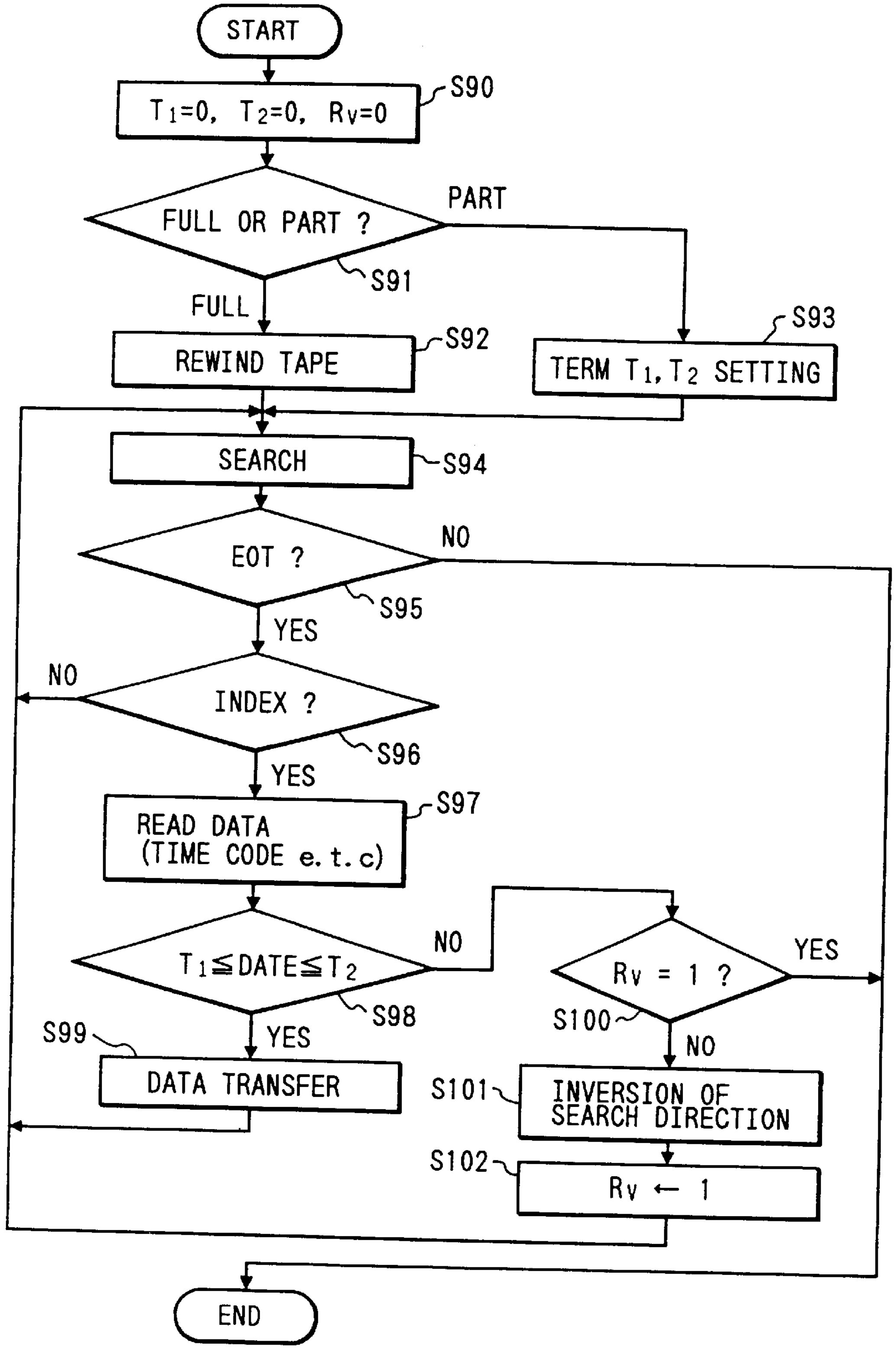
FIG. 12 is a flow chart which illustrates another example of the partial printing operation in the automatic printing process.

According to the aforesaid automatic printing process as shown in FIG. 12, partial printing of the cassette can be automatically performed by specifying the range by a retrieval means which can be easily handled by the human sensitivity. Therefore, a video printing system which can be easily handled can be constituted.

As described above, according to this embodiment of the present invention, in a case where image data is transferred from the VTR to the printer, the operation state of the printer is confirmed, and then the VTR searching operation is controlled according to the operation state. Therefore, by previously recording print data to the video tape, a plurality of pictures can be sequentially searched and the printing out operation can be automatically performed immediately after the printing operation has been completed. As described above, the non-efficient printing work, which has taken a too long time according to the conventional technology can be automated. Therefore, the home video printing culture can be promoted.

Furthermore, in a case where a development to an external printing laboratory is made in the present photograph DPE system, a novel electronic photography DPE culture can be created in which a video tape, to which printing out information has been inputted, is brought to a printer service shop capable of printing a higher image quality because the automatic printing can be enabled.

Since data is transferred to the printer side buffer memory in a compressed state, the data transference speed can be raised and therefore the number of pictures which can be stored in the memory can be increased. Therefore, the delay of the work due to the Busy state generated during the operation of the printer can be prevented satisfactorily and the time taken to complete the process can be shortened.

As described above, according to this embodiment, the structure comprises detection means for detecting an index signal recorded to a recording medium together with an image signal and acting to specify a picture to be printed, setting means for setting conditions for retrieving the picture to be printed, extracting means for extracting the index signal which corresponds to the set retrieval condition and printing means for printing only a specified picture in response to the extracted index signal. Therefore, in a case where a plurality of pictures are desired to be printed, head searching can be automatically performed by only performing the initialization by a user. Therefore, only a desired picture can be automatically printed and therefore the efficiency of the operation of printing a part of a recording medium can be significantly improved.

Figure 9:
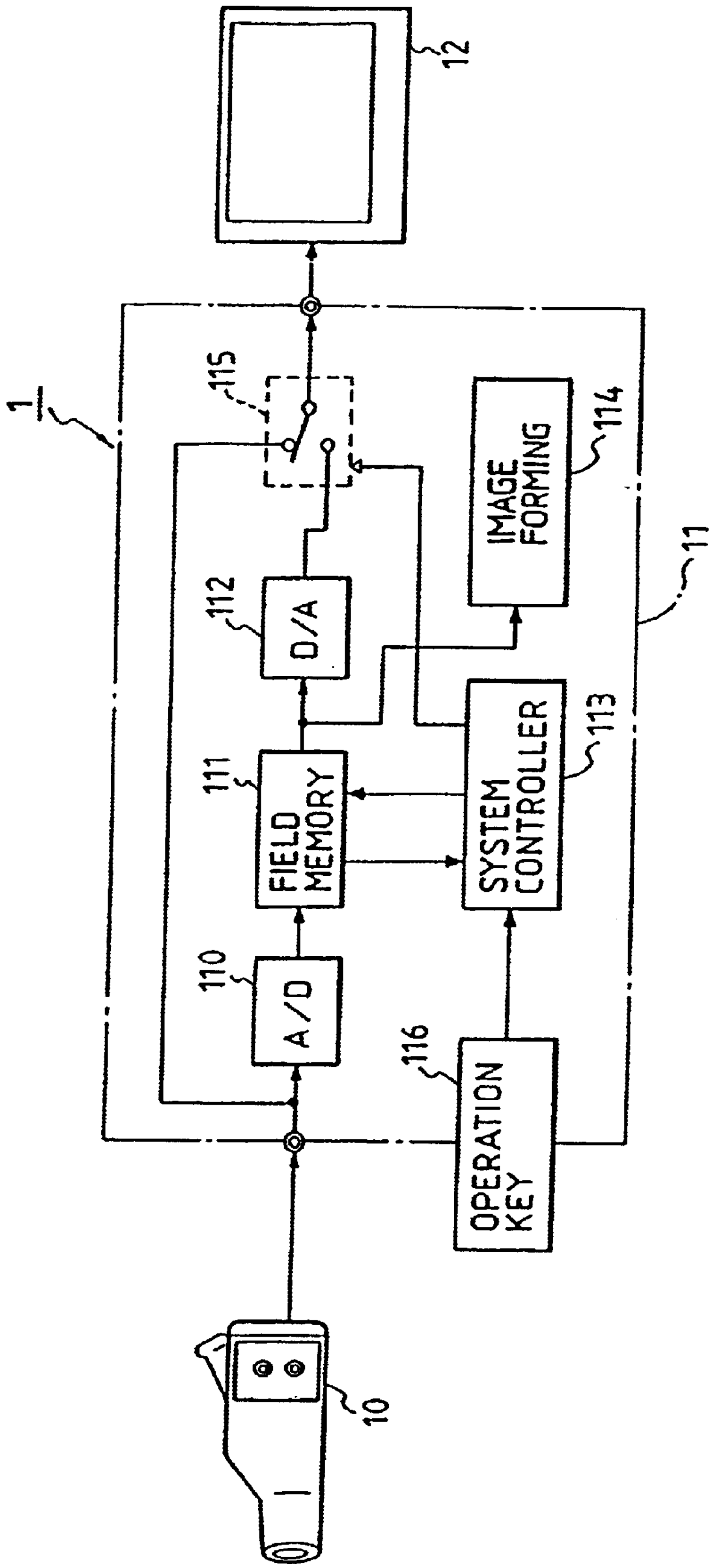
FIG. 9 is a schematic structural view which illustrates a conventional video print system.

According to the aforesaid embodiment, the results of rough estimation of the data quantity which corresponds to the aforesaid modes 1 to 16 and the number to be stored in the memory are shown in FIG. 8 while making the non-compressed information about the HD frame picture to be a reference and assuming a buffer memory capable of storing only one picture. As described above, it can be understood that data about several to tens of still images can be stored in one buffer memory 65 according to the mode. A specific example of the storage capacity of the buffer memory 65 is shown in FIGS. 14 to 17 while assuming that the storage capacity of the buffer memory 65 to be data about one picture which is not compressed. Referring to FIGS. 14 to 17, "A" is an image which is not compressed, "B" and "C" are images which are compressed at a rate of ½, and "D" to "G" are image which are compressed at a rate of ¼. The image data item expressed by "A" is stored by the buffer memory 65 as shown in FIG. 9, the image data items expressed by "B" and "C" are stored by the same as shown in FIG. 10, image data items expressed as "D" to "G" are stored by the same as shown in FIG. 11 and image data items expressed as "B", "D" and "E" are stored by the same as shown in FIG. 12.

According to the aforesaid embodiment, when image data transferred from the VTR unit 90 or the video camera 20 is temporarily stored in the buffer memory 65 of the video printer unit 14, it is compressed according to the compression rate. Therefore, the quantity of image which can be stored can be enlarged and therefore the efficiency of printing out a plurality of pictures can be improved.

Another embodiment of the present invention will now be described with reference to FIG. 19 and ensuing drawings.

Figures 19, 19A:
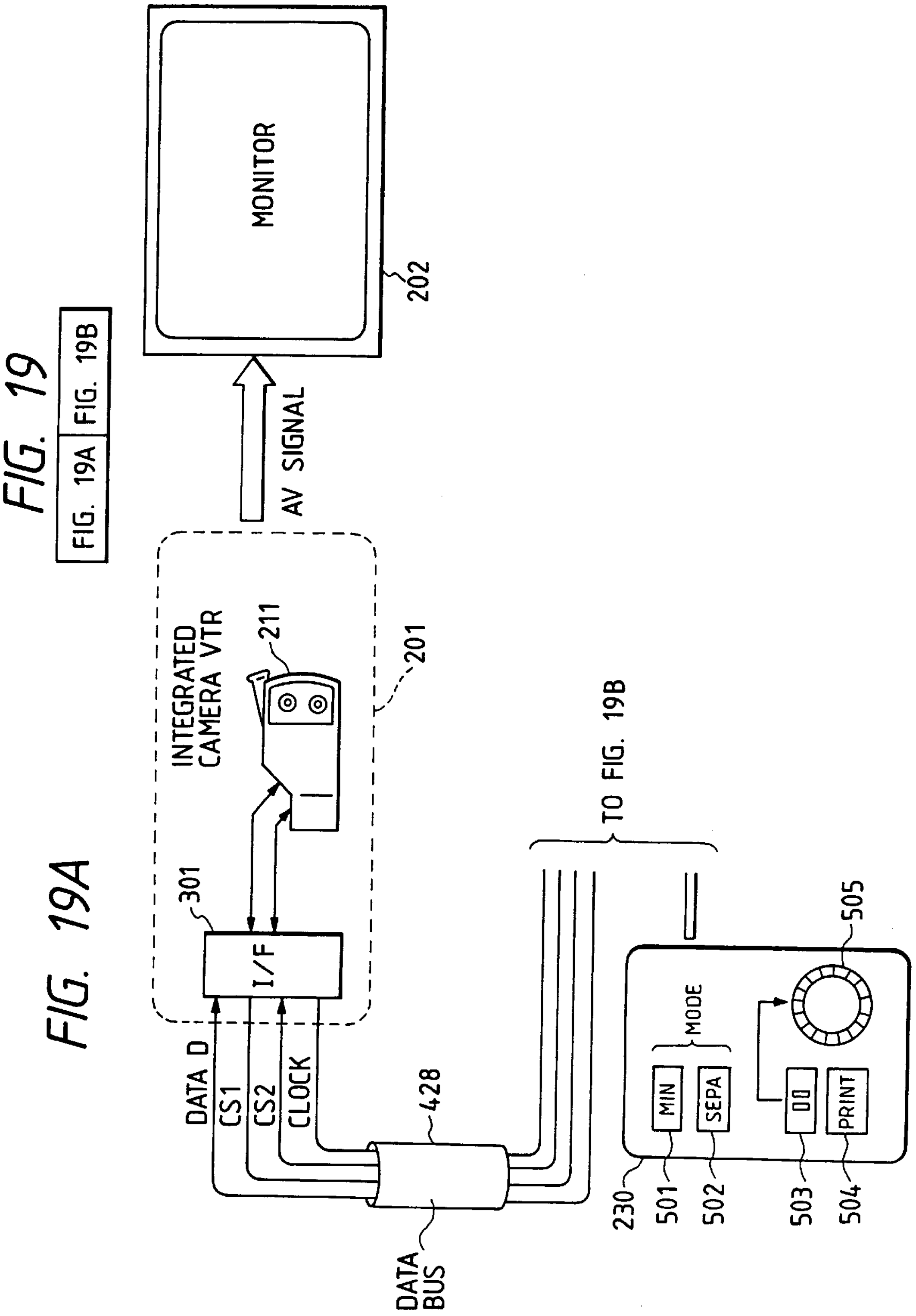
FIG. 19, which is comprised of FIGS. 19A and 19B is a structural block diagram which illustrates another embodiment of a video print system according to the present invention.
Figure 19B:
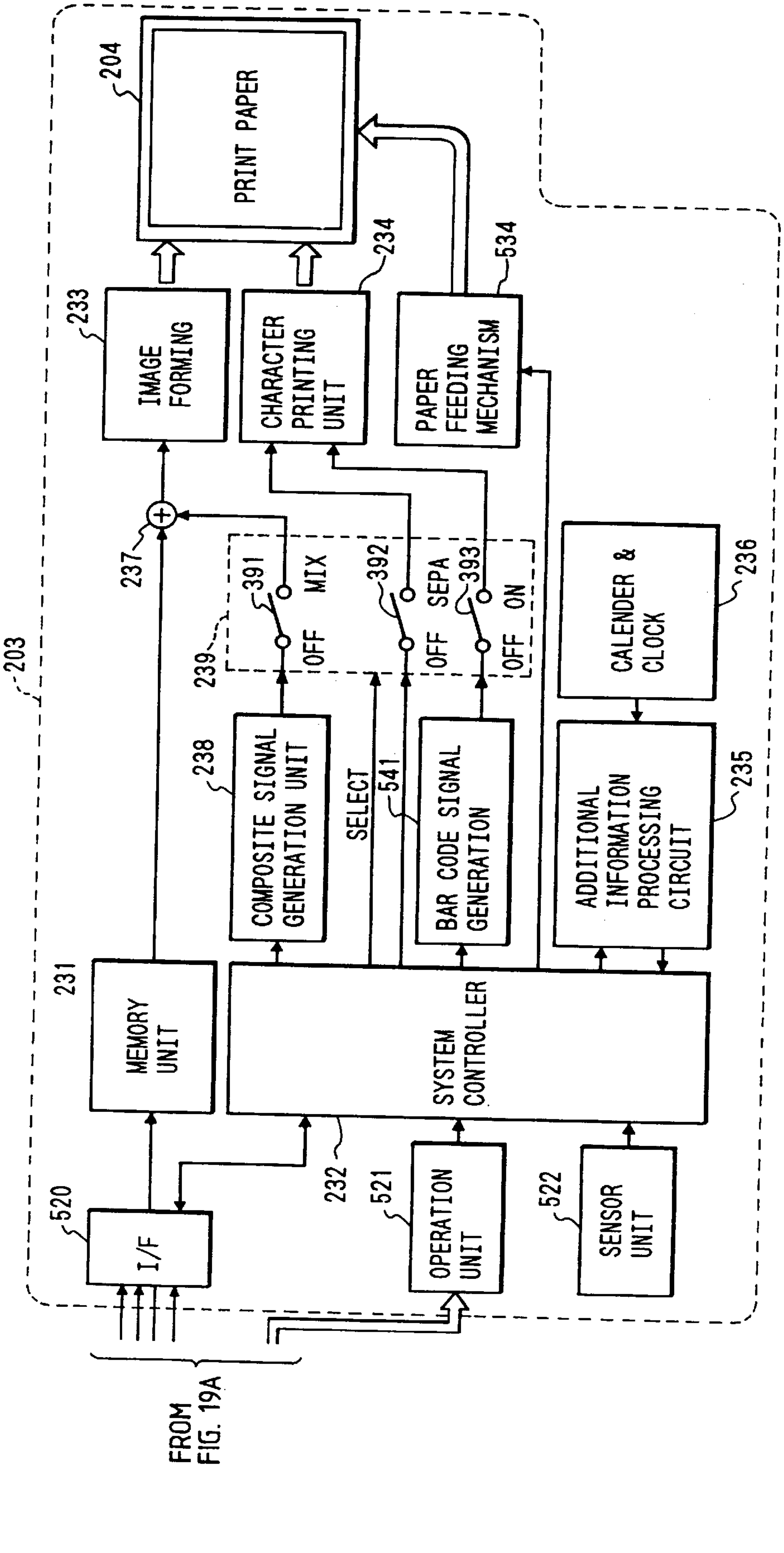

FIG. 19 is a block diagram which illustrates an embodiment of a video printing system according to the present invention. Referring to FIG. 19, reference numeral 201 represents a video recording/reproducing apparatus (VTR), 202 represents a monitor and 203 represents a video printer. The VTR 201 comprises a camera integrated VTR 211 and a digital interface 301, the VTR 201 being connected to a digital interface 520 in the video printer 203 by a data bus. The video printer 203 includes required mechanisms such as a memory unit 231, a system controller (also called a "SYS-CON") 232, a picture-printing unit 233, a character-printing unit 234, signal processing unit 238 and print paper 204. Reference numeral 230 represents an operation unit which is attached or integrated with the video printer. As a result, the operation unit 230 is able to control the printing operation and the operation of the VTR.

Figures 20, 20A:
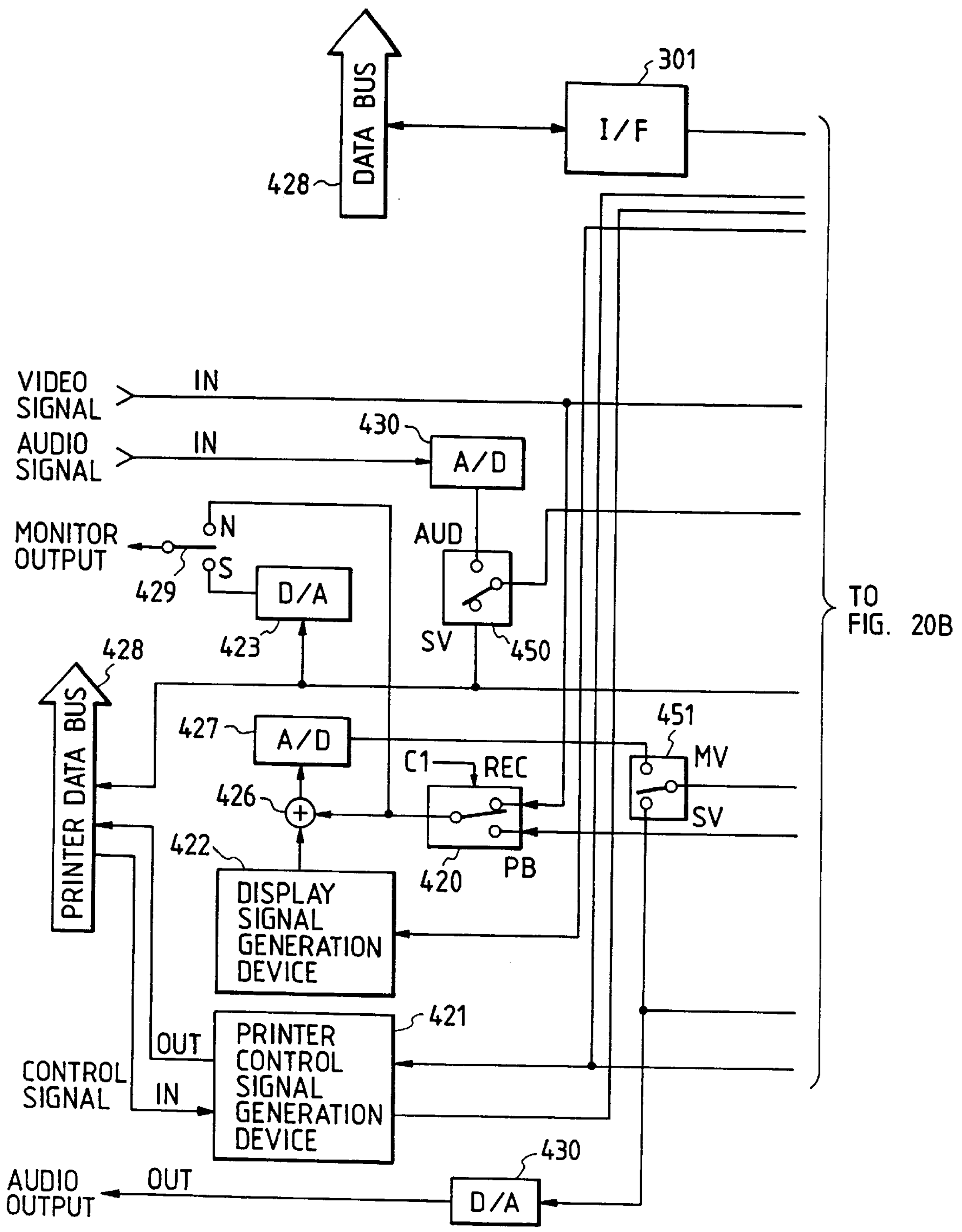
FIG. 20, which is comprised of FIGS. 20A and 20B is a block diagram which illustrates a VTR unit of the system shown in FIG. 19.
Figure 20B:
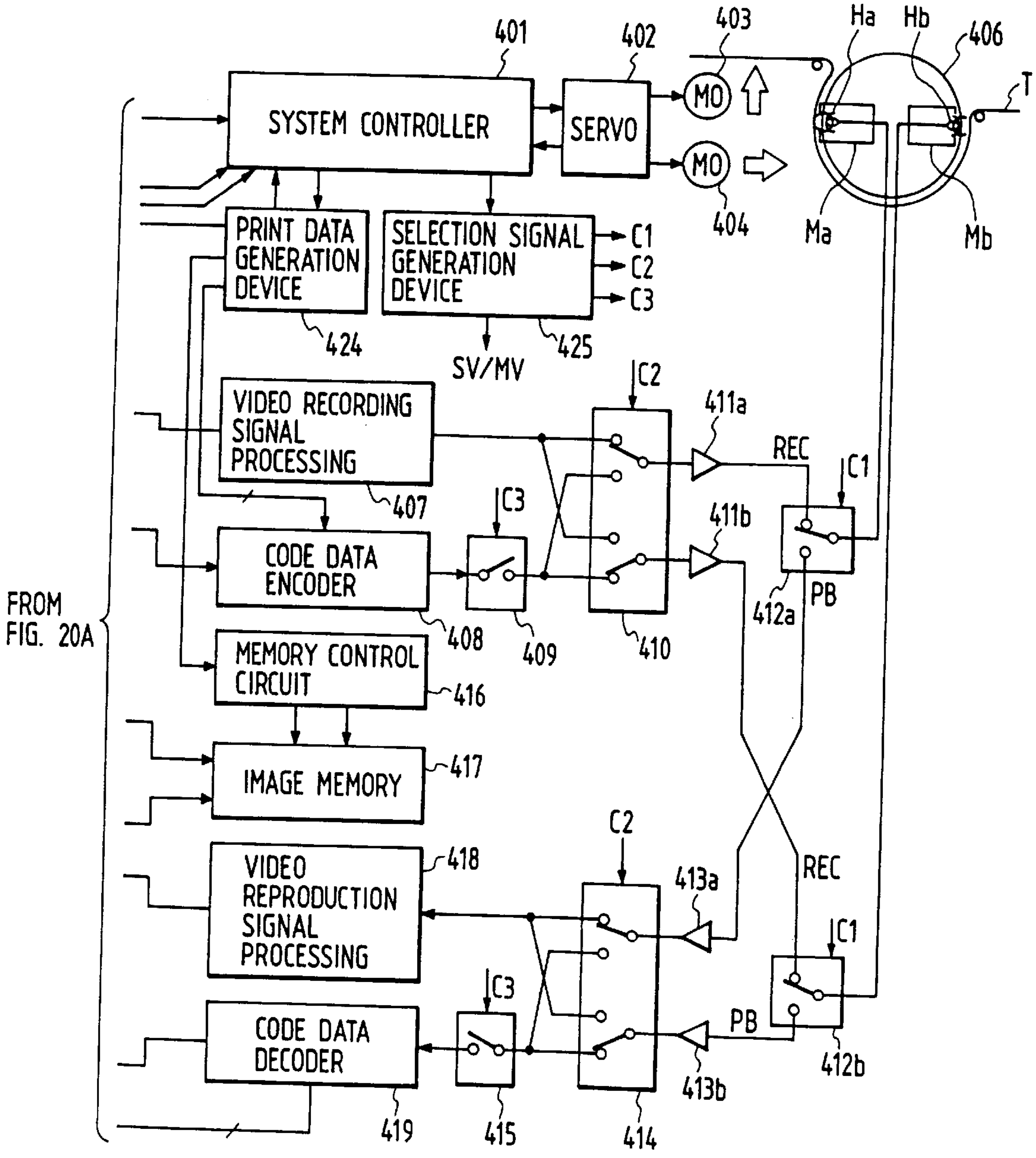

FIG. 20 is a block diagram which illustrates the structure of the VTR body having structural units such as a system controller 401, a servo system 402 and a drum 406 which are provided similarly to the conventional structure. However, there is a difference in that operation control signals (CS1, CS2 and clock data) are supplied/transmitted to and from the system controller 401 via a digital interface (I/F) 301 connected to a data bus 428 connected to the printer.

Recording format of print data will now be described with reference to FIGS. 21 and 22.

Figure 21:
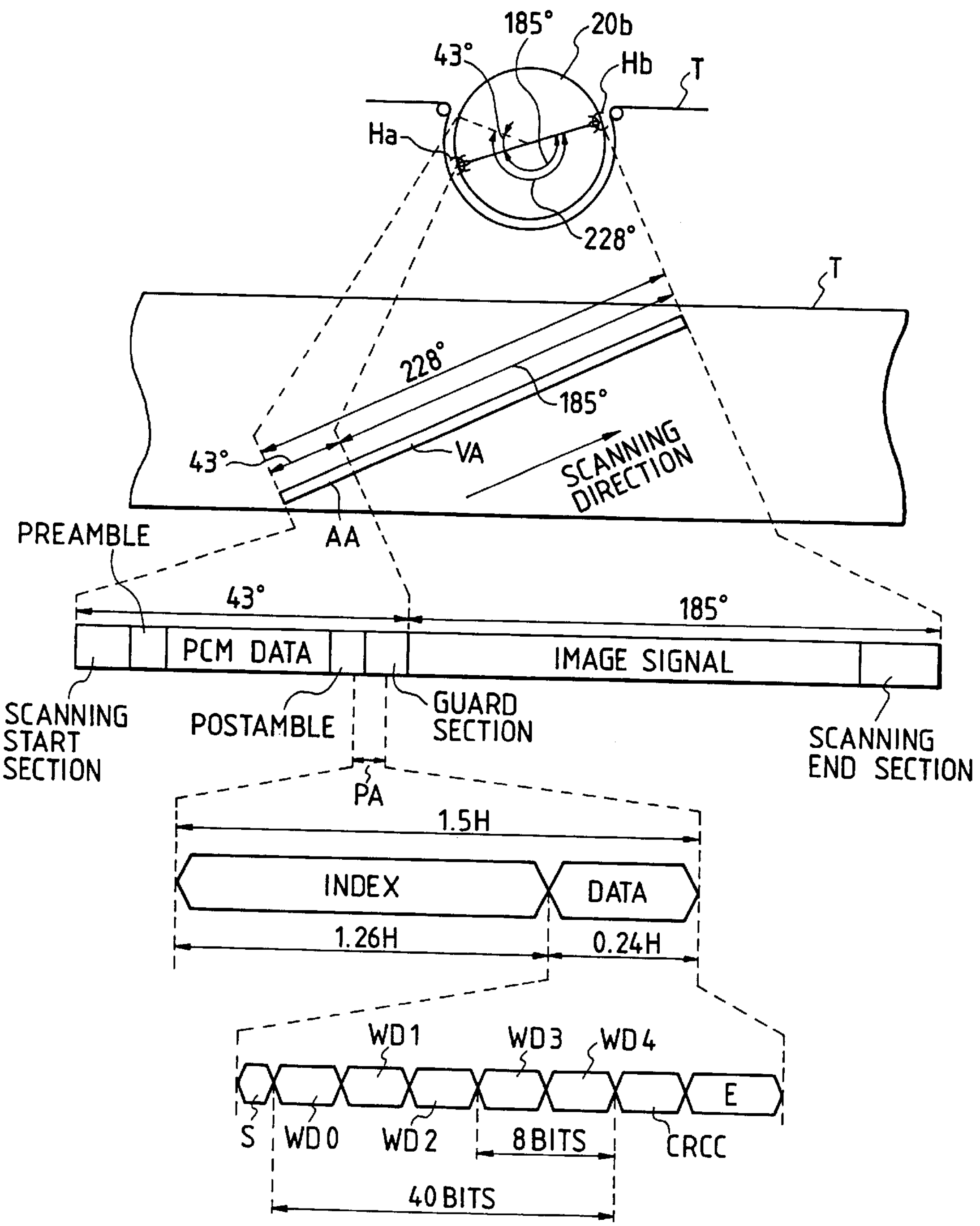
FIG. 21 illustrates a recording format for use in the embodiment of the present invention.

As shown in FIG. 21, a print data area PA corresponds to 1.5 horizontal scanning period (H) of the video signal. That is, the aforesaid switch 409 is switched on in only a period which corresponds to the aforesaid 1.5H. The area for 1.5H is divided into an index unit for 1.26H and a data unit for 0.24H as shown in FIG. 21. A head searching signal to be described later is recorded to the index unit, while print data is recorded to the data unit.

As shown in FIG. 21, five word WDO to WD4, start identifying data S, end identifying data E and error correction CRCC are recorded to the data unit. Each of the words WDO to WD4 is constituted by 8 bits and has the contents as shown in (a), (b) and (c) of FIG. 22.

Figure 22:
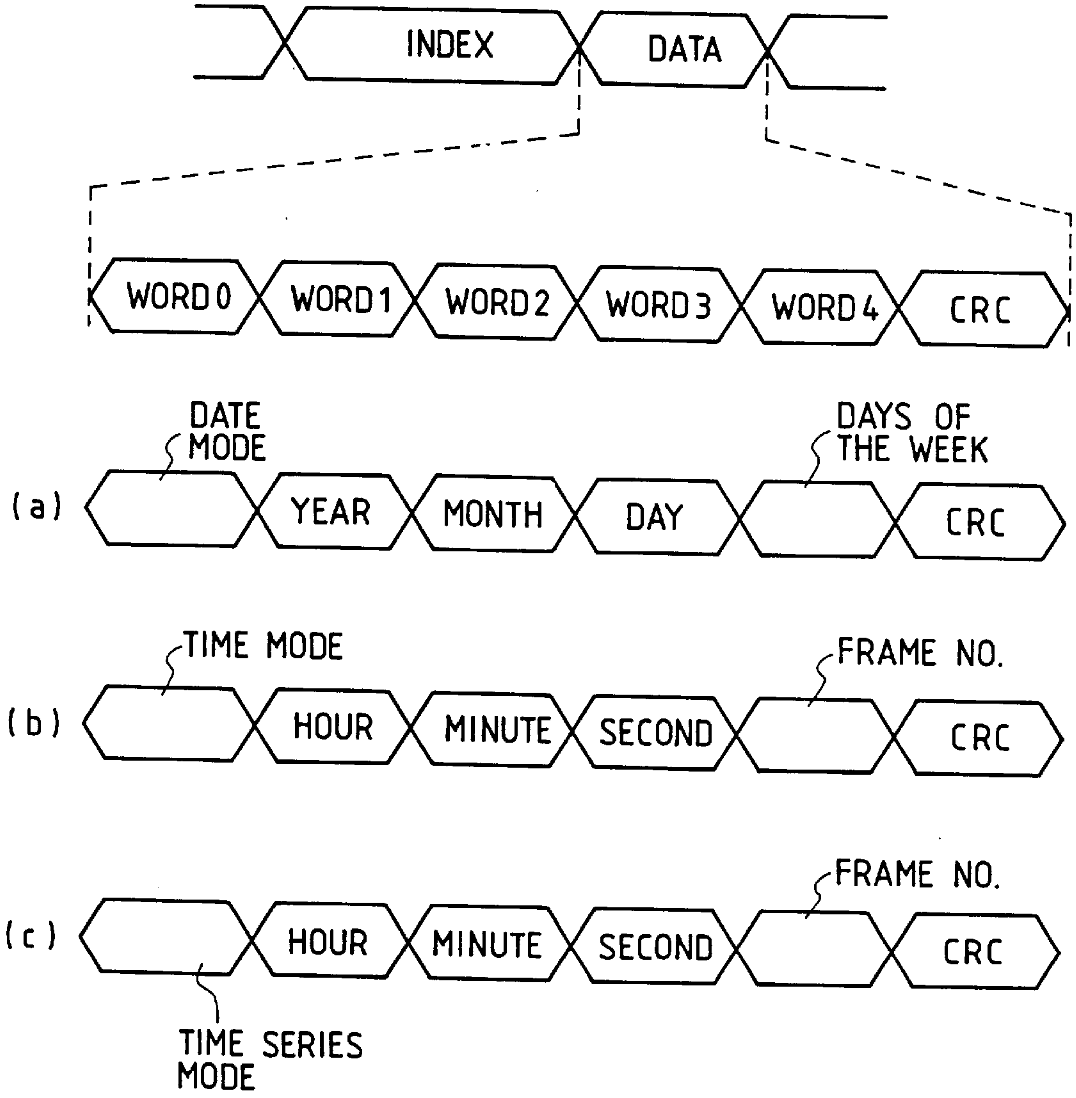
FIG. 22 illustrates record data for use in the present invention.

FIG. 22(*a*) illustrates a date mode in which the date and the day of the week and the error correction code are expressed by 8 bits, FIG. 22(*b*) illustrates a time mode in which the time of the photography, the frame No. and the error correction code are expressed by 8 bits and FIG. 22(*c*) illustrates a time series mode in which the time frame No. from the start unit of the tape and the error correction code are expressed by 8 bits.

The modes shown in (a), (b) and (c) of FIG. 22 may be arbitrarily selected or a plurality (for example, those shown in FIGS. 22(*a*) and 22(*c*)) of modes may by alternately recorded to the track.

Figure 23:
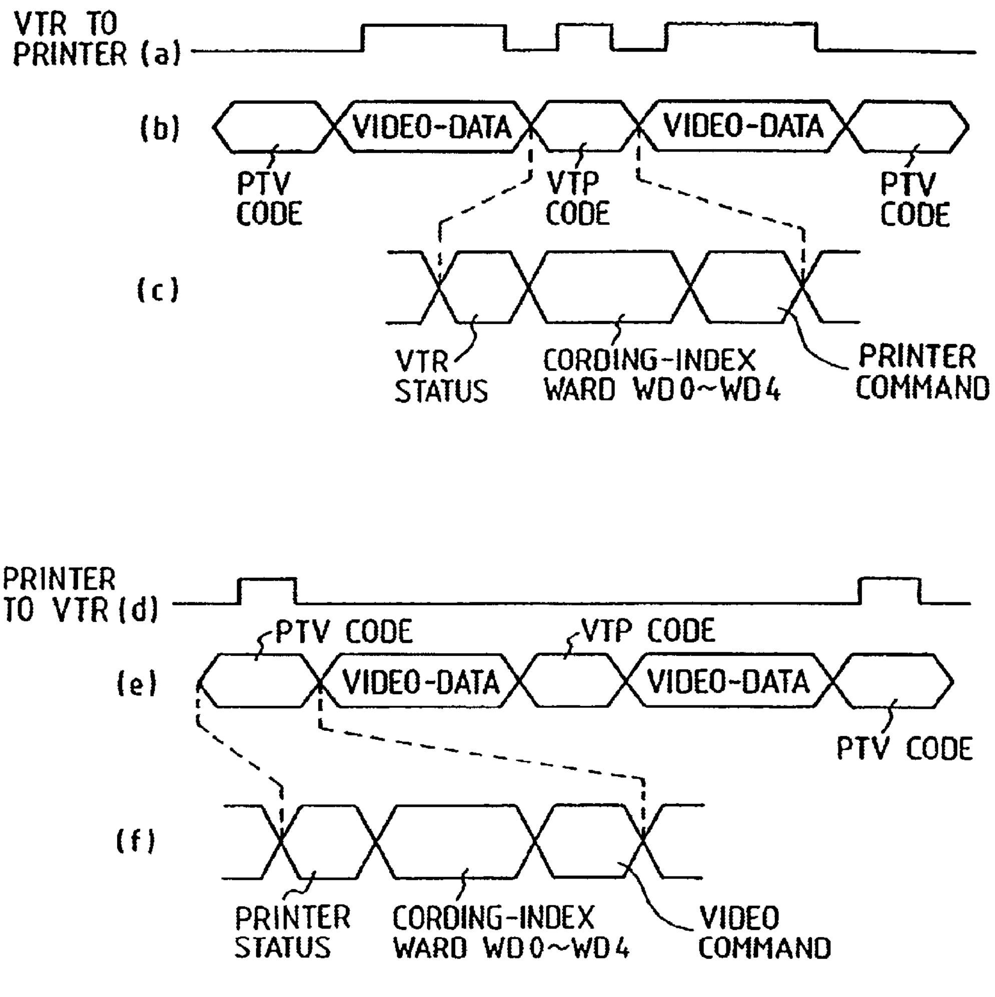
FIG. 23 is a timing chart of data in the data bus.

The timing of each data on the data bus is shown in FIG. 23. The upper units (a), (b) and (c) of FIG. 23 illustrate information called "VTR data" to be supplied from the VTR to the printer, where (b) illustrates digital still image information (VIDEO-DATA) and a VTP code. FIG. 23(*a*) illustrates a signal of the line CS1 shown in FIG. 19, while FIG. 23(*b*) illustrates data D shown in FIG. 19.

As shown in FIG. 23(*c*), the VTP code is composed of VTR STATUS code showing the state of the operation of the VTR, words WDO to WD4 of CORDING-INDEX which are the aforesaid 8 mm VTR sub-code data and print command data for supplying various commands to the printer.

As shown in the timing chart (a), a change takes place from "L" to "H" according to the transmission timing from the VTR.

The lower portions (d), (e) and (f) illustrate information to be supplied from a printer called a "PTV" to the VTR, where (e) illustrates digital still image information (VIDEO-DATA) and a PTV code. FIG. 23(*f*) illustrates a signal of line CS2 shown in FIG. 19, while FIG. 23(*e*) illustrates data D shown in FIG. 19. The data line for (b) and (e) are made to be different lines or made to be a common line in order to decrease the number of the signal lines.

The PTV code is composed of PRINTER STATUS showing the state of the printer as shown in FIG. 23(*f*), WDO to WD4 similar to FIG. 23(*c*) and a video command which is a command of the video operation.

The operation of a jog shuttle dial 305 or the like of the operation unit 230 shown in FIG. 19 is transferred to the VTR by using the aforesaid data area.

FIG. 24 illustrates a bit map for each information.

The aforesaid video command is illustrated in the lowermost unit and arranged to instruct to write or read coding index information or the like from a tape T with the 0-th bit and instruct a region to which reading/writing is made with the first and the second bits. Since the PCM sub-code has a multiplicity of information areas as well as the INDEX, instruction can be enabled by identifying 4 units or less by using the two bits. The third bit makes digital data such as PCM-SV to "H" when a command of transferring image data is issued according to the transference timing of video data shown in FIG. 23. The fourth to the seventh bits are used to specify the VTR search mode. With this, the following state of running can be specified:

0 REWIDE
1 SEARCH×(−20)
2 SEARCH×(−5)
3 SEARCH×(−1)
4 REVERSE×(−1)
5 SLOW SPEED REV. PLAY
6 VERY SLOW SPEED REV. PLAY
7 STILL
8 STOP
9 VERY SLOW SPEED PLAY
ASLOW SPEED PLAY
BPLAY×1
C SEARCH×2

D SEARCH×5
E SEARCH×20
FFF

The four data words WD1 to WD4 are allocated in such a manner that 2 bits are allocated to the sort number, two bits are allocated to the magnification (print size) and four bits are allocated to the number of prints. That is, four types (four groups) of sort numbers can be set and individual magnifications can be set to each of the types. The number of prints can be set from 0 to 14 by using four bits. In a case where all of the four bits are "1", a special fact of multi-picture printing is meant. This means a printing operation in which 25 pictures next to the picture which is being reproduced is printed as one picture. It means a state of printing which enables an effect obtainable from a strip of contact print of a photographic negative in a conventional silver salt photography to be expected.

The word WD0 is a control word for controlling the words WD1 to WD4 and includes one bit (the second bit) which shows whether the print picture is made by data for one field or data for one frame and one bit (the first bit) which shows whether or not the printing operation has been completed. The 0-th bit is a bit which shows whether or not there is a print specified picture (hereinafter called simply as a "parent picture" in 10 seconds immediately before the picture to be printed. The setting of the 0-th bit will be described later. The third to the seventh bits are 5-bit data which shows the order of the frame defined by the time code or the like to which the print picture corresponds.

The operation of the system according to this embodiment will now be described.

First, the schematic flow of the operation of the video print system will now be described with reference to FIG. 19.

Information supplied from the VTR unit 201 and digitized by the digital I/F (interface) 301 is transferred to the video printer 203 via the data bus. Additional data such as image information, the control signal and the date information is temporarily received by the I/F 520 before it is supplied to the memory unit 231 and the system controller 232.

The system controller 232 selects data and controls the operation.

Date information and comment information supplied from a character generator of the video camera 211 are converted into video signals by a synthetic signal generating unit 238 for making it to be a visual image signal. Then, they are synthesized with still image information transmitted from the memory unit 231 by the synthesizing unit 237 at the time of closing the switch 591 so as to be printed onto the print paper 204 by the picture printing unit 233.

On the other hand, information similar to the aforesaid information is usually supplied to the character printing unit 34 at the time of closing the switch 592 so as to be printed to a unit except for the picture printing area of the picture printing unit 233 on the print paper 204 by the character printing head. It may, of course, be synthesized and printed to the print paper 204 and this case is included within the scope of the invention.

Additional data to words WD0 to WD1 may be subjected to the generation process by a bar code signal generator 541 as digital binary information as it is and printed on the same paper 204 by the character printing unit 234.

When data is recorded, control is performed in such a manner that the switch 593 is closed.

When the aforesaid three types of recording operations are performed onto the same paper 204, a paper feeding mechanism is caused by the system controller 232 to control the paper feeding operation and the locating operation.

In order to perform processes relating to the time such as the date and the time of the printing out operation and the over all control by means of the timer, a calender & clock 236 is included and information from it is processed by the additional processing circuit 235 together with data WD0 to WD4.

The operations of the aforesaid switch 239 (591 to 593) is detected by the operation unit 521 which controls the manual operation buttons such as the mode selection switches 501 and 502 provided for the printer 203 and is processed by the system controller 232 so as to be selection-processed as a SELECT signal.

Figure 26:
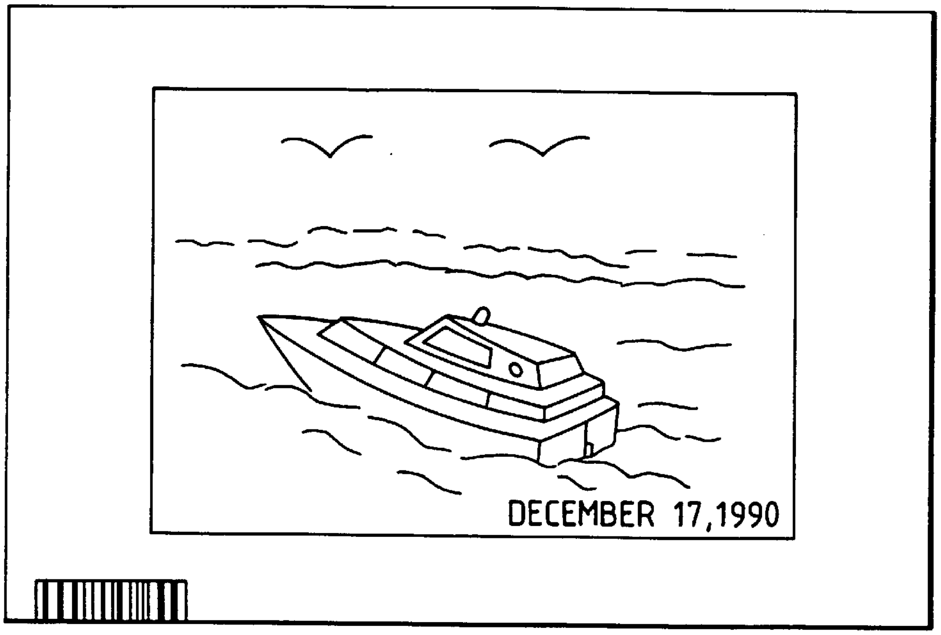
FIG. 26 illustrates an example of the formed print.

The sensor unit 522 is a detection processor for reading bar code information shown in the lower left portion of FIG. 26.

The aforesaid operation is performed while being confirmed by an image/audio (AV) monitor device 302 connected to the VTR 201.

The video signal reproduced by the recording/reproducing unit 201 is supplied to the monitor device 202. An operator operates the camera integrated VTR 11 by the operation unit 230 provided for the printer while observing an image displayed on the monitor device 202.

That is, the fast winding or rewinding operation is performed while searching the image until a desired picture to be printed out comes closer and the picture is retrieved while confirming the image by performing the slow speed reproduction or the still reproduction operation. The aforesaid operations are performed by using the known jog shuttle dial 505 or a pause button 503.

A VTR search operation command generated at the time of the aforesaid operation is supplied to the data bus shown in FIG. 19 and data is transferred between the I/F 520 and the I/F 301 before it is supplied to a remote control terminal (for example, a rank terminal) of the camera integrated VTR.

The operation of the system according to this embodiment will now be described with reference to a flow chart shown in FIG. 25.

First, the VTR 211 is brought to the reproduction mode by operating the operation unit 230 shown in FIG. 19. At this time, the system controller 401 of the VTR 211 shown in FIG. 20 controls each unit of the apparatus according to control information supplied from the control unit 521 via the I/F 520 and 301. For example, the system controller 401 controls the capstan motor 403 and the drum motor 404 via the servo circuit 402 and as well as controls the switches 429, 412*a*, 412*b* and 414 via the selection signal generator 425. The reproducing speed can, of course, be arbitrarily changed by the aforesaid dial 505 and the pause key 503 in this reproduction mode. The aforesaid change can be realized by changing the rotational speed of the capstan motor 203. Furthermore, the relative speed between heads Ha and Hb and the tape T can be maintained at a constant speed by changing the rotational speed of the drum motor 404. Furthermore, the difference in the inclination between the trace locus of the head and the track is always absorbed by the head moving mechanisms Ma and Mb.

In the aforesaid reproducing mode, reproduction video signals supplied from the recording/reproducing heads Ha and Hb disposed on the drum 206 are made to a continuous signal via PB terminals of the switches 212*a* and 212*b*, the amplifiers 213*a* and 213*b* and the switch 214 before it is supplied to the video reproducting signal processing circuit 218. The video signal supplied from the signal processing circuit 218 is transmitted to the monitor 202 shown in FIG. 19 via the PB side of the switch 420 and the N side of the switch 429.

On the other hand, digital data reproduced by the audio area AA and the data area PA is converted into an analog signal by the D/A 230 via the switch 214, the switch 215, which is usually always closed, and the code data decoder 219 before it is transmitted. In a case of still image data, it is temporarily stored in the image memory 217 via the SV side terminal of the switch 251.

The operator retrieves a desired picture by operating a dial 305 or the like while confirming a picture transmitted from the monitor 202. At the time at which the desired picture is displayed, the operator operates the pause key 503 so as to bring the VTR 11 into the still image reproducing mode. When a print specifying button 504 is operated in this state, this information is transmitted from the key operation unit 521 to the system controller 401 via the system controller 232 and the I/F 520 and 301.

Figure 25:
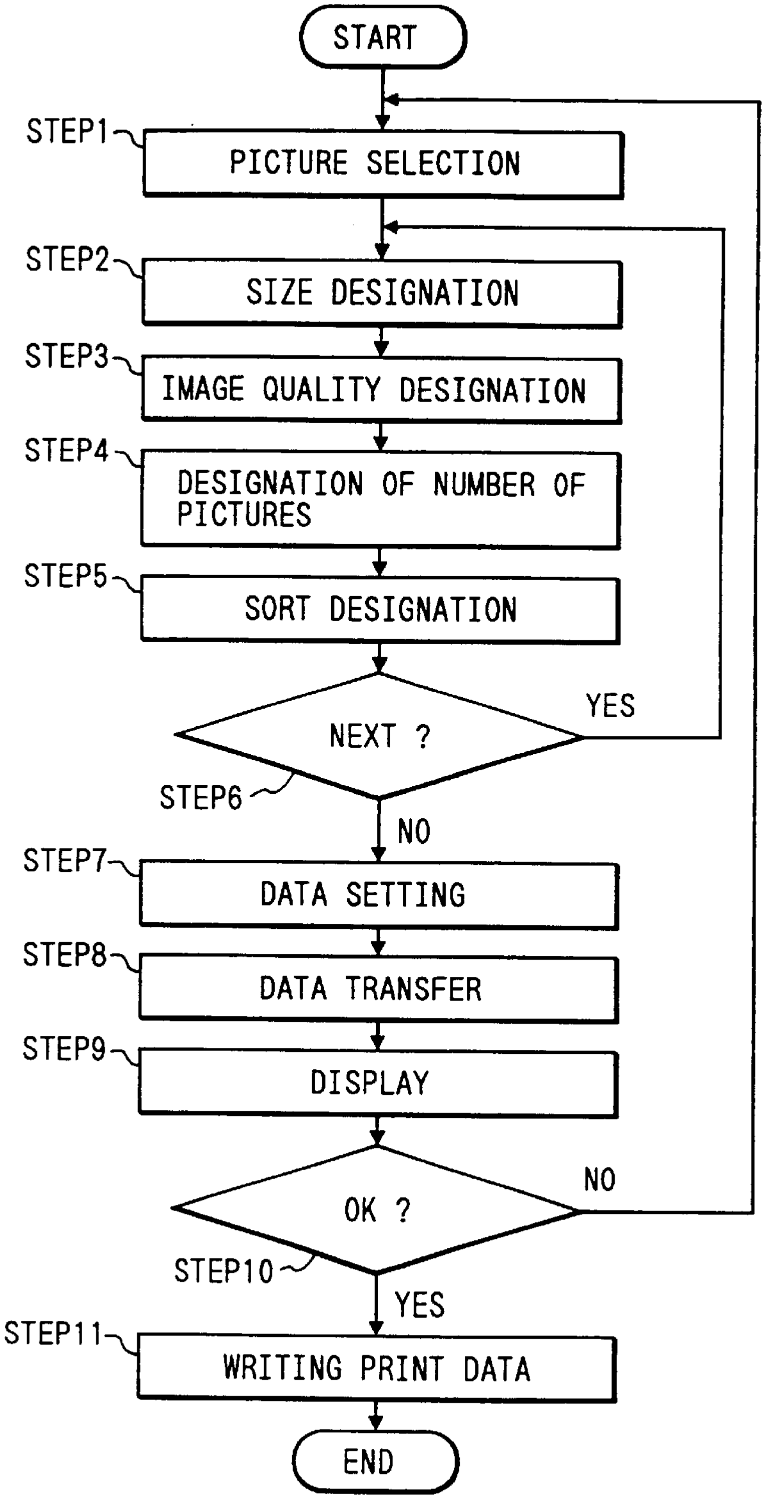
FIG. 25 is a flow chart which illustrates the operation of the embodiment shown in FIG. 19.

The aforesaid operation corresponds to step 1 of a flow chart shown in FIG. 25.

Then, the flow proceeds to step 2 shown in FIG. 25 in which the size of the print is specified with the operation unit 521. The operation unit 521 is used to specify the image quality (step 3), the number of prints (step 4) and the sort (step 5). The aforesaid steps 2 to 4 are respectively set for each print size. Whether or not there is another print size is specified with the operation unit 521 in step 6. If it is present, the flow returns to step 2. If it is not present, the flow proceeds to step 7.

In step 7, data (hereinafter called "print data") generated in the aforesaid steps 2 to 5 is transferred to the system controller 401 via the I/F 520 and 301 and is generated by the print generator 424. In step 8, the aforesaid print data is transmitted to the code data encoder 208 and is also transmitted to the display signal generator 422. At this time, a reproduction video signal transmitted via the switch 420 and the output signal from the display signal generator 422 which corresponds to the aforesaid print data are mixed with each other by the adder 426. A video signal which corresponds to the picture formed by multiplying an image to be printed and a character showing print data is digitized by the A/D converter 427. The output from the A/D converter 427 is supplied to the image memory 417. At this time, the print data generator 424 receives video signal for one frame from the A/D converter 427 in accordance with an instruction made by the memory control circuit 416 and repeats the aforesaid operation. As a result, the video signal supplied from the image memory 417 is converted into an analog signal by the D/A converter 423 before it is transmitted to the monitor 202 via the S side of the switch 429 (step 9).

Then, the operator confirms the picture to be printed and print data while observing the picture displayed on the monitor 202 so as to check whether or not the contents of the picture are the contents of the desired picture (step 10).

If the contents are different from those of the desired picture, the flow returns to step 1 and the operation is again started. If the contents are those of the desired picture, the flow proceeds to step 11 in which the aforesaid print data is recorded.

Then, recording of the aforesaid print data will now be described.

Usually, if the VTR shown in FIG. 19 is in the recording mode, the state of the video signal received by the video recording signal processing circuit 407 is discriminated to be suitable to be recorded and therefore the video signal is supplied to the switch 410. On the other hand, the audio signal digitized by the A/D converter 430 or the digitized still image data is read out from the memory 417 after its data rate has been lowered. Then, the switch 450 acts to select the AUD terminal in the case of the audio signal or the SV terminal in the case of the still image. The code data encoder 408 encodes it before it is supplied to the switch 410 via the switch 409 which is always closed. FIG. 21 schematically illustrates the rotational phase of the heads Ha and Hb and the trace position on the tape T. The switch 410 causes the video recording signal processing circuit 407 to be connected to the amplifiers 411*a* and 411*b* in a period in which the heads Ha and Hb trace the video area VA. On the other hand, it causes the code data encoder 408 to be connected to the amplifiers 411*a* and 411*b* in a period in which the heads Ha and Hb trace the audio area AA.

In a case where print data is recorded according to step 11 shown in FIG. 25, the switch 409 is controlled in response to a signal C3 supplied to the selection signal generator 425 in such a manner that it is switched on in only a period in which the print data area PA is traced by the heads Ha and Hb, the print data area PA corresponding to the postamble unit of the audio-area AA and a unit of the guard region. Furthermore, the switches 212*a* and 212*b* are connected to the REC side in only the aforesaid period in response to the signal C1. As a result, print data encoded by the code encoder 208 can be recorded to the print data area PA on the tape T. That is, if a discrimination is made in step 10 that the contents of the print picture and print data are as desired, print data is recorded to the print data area PA of the track to which the video signal, which is being reproduced, has been recorded in step 11. That is, print data shown in FIG. 22 is recorded to the print data recording area PA of the track to which the print specifying picture is recorded.

Then, the system controller 401 rotates the capstan motor 403 at the same speed as the normal recording speed so that the head searching signal is recorded to the aforesaid header unit for 10 seconds. Usually, a 2.9 MHz carrier signal is recorded to the header unit and a 5.8 MHz carrier signal is recorded to the unit which corresponds to the aforesaid 10 seconds. The 1 bit showing whether or not the parent picture of the O-th bit of the aforesaid word WDO reproduces the head searching signal in step 10 shown in FIG. 25. If it is 5.8 MHz, "1" is automatically set.

An operation of printing the print specifying picture from the tape, to which the print specifying picture is set, will now be described.

When the tape, to which the print specifying picture has been set, is first loaded in the VTR 211 and a print command is issued with the key operation unit 321, the system controller 410 rotates the capstan motor 403 and the drum motor 404 via the servo circuit 402. As a result, the signal transmitted from the aforesaid print data area PA is reproduced while winding the tape T at high speed. At this time, the switches 412*a* and 412*b* are connected to the PB side, while the switch 414 causes the amplifiers 413*a* and 413*b* to be connected to the code data decoder side. The a switch 415 is switched on at the timing at which the heads Ha and Hb trace the print data area PA, and the code data decoder 419 transmits "1" as the head searching control signal when the aforesaid head unit reproduction signal is 5.8 MHz. In response to the fact that the head searching control signal has become "1", the system controller 401 controls the capstan motor 403 in such a manner that the tape is run in the opposite direction to the direction at the time of the recording operation at the same speed as that at the time of the recording operation.

In this state, the code data decoder 419 reproduces data supplied from the data unit. If all of the 4-bit data of data shown in FIG. 24 showing the number of prints are not zero, the system controller 401 stops running of the tape T. At this time, either of a mode in which running of the tape T is stopped in only a period in which non-printed data is being detected or a mode in which running of the tape T is stopped regardless of whether or not the data has been printed may be set.

The heads Ma and Mb of the head moving mechanism trace the track to which the specified pictures have been recorded in the state where the tape T is stopped. The reproduction signal at this time is received by the image memory 417 via the video reproducing signal processing circuit 418, the adder 426 and the A/D converter 427. Print data is, via the code data decoder 419, received by the printer control signal generator 421 acting as an interface. When the aforesaid receiving operation has been completed, data stored in the image memory 417 and printer control data transmitted from the printer control signal generator 421 are transferred to the printer data bus 428. The printer 203 prints video data supplied via the data bus 228 according to the control data. When the printing operation is completed, the printer 203 transmits data showing the completion of the printing operation to the data bus 428. The print completion data supplied from the printer 203 is transmitted to the system controller 401 via the printer control signal generator. In accordance with this, the VTR performs the next operation.

That is, when the print completion data is supplied to the VTR, rewriting of print data to "0" is performed if the first bit of the word WD0 is "1". Since the operation of the VTR at this time is the same as that to be performed at the time of recording print data, its description is omitted here. Then, retrieval of the next specified picture is performed in such a manner that, in a case where the parent picture is present, the flow starts at the step in which the tape is run at the same speed as that at the time of the recording operation in the opposite direction. In a case where it is not present, the flow starts at the step in which the tape is run at a high speed in the forward direction.

Figure 27:
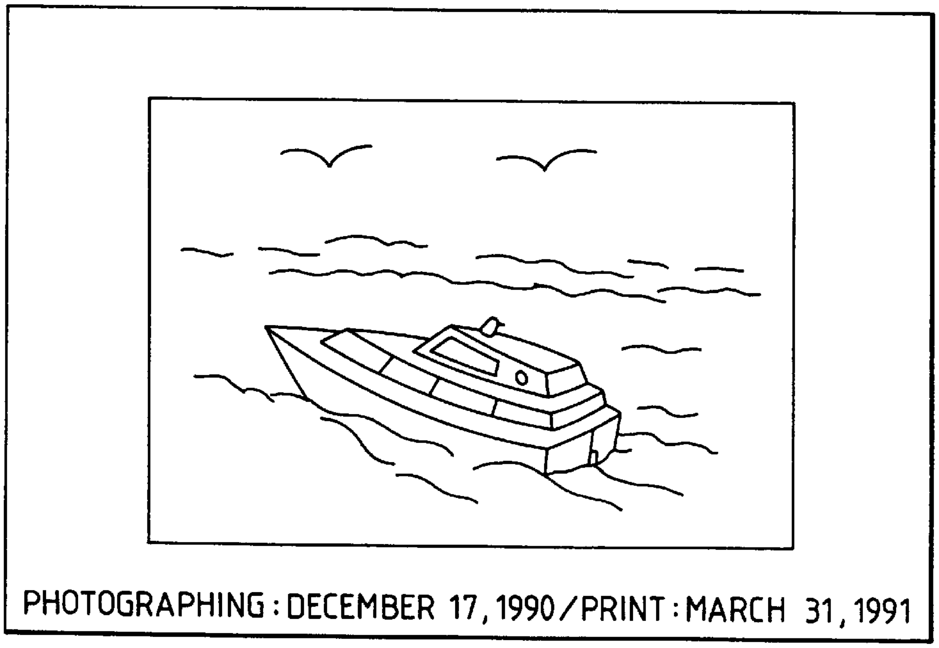
FIG. 27 illustrates an example of the formed print.

Then, an example of application of the print to be transmitted from the system according to this embodiment is shown in FIGS. 26 to 28. FIGS. 26 and 27 illustrate examples of an equal-magnification printing operation, wherein the aforesaid print data of WD0 to WD4 is recorded in the form of a bar code in the lower left unit of the print. If the sensor unit 522 of the printer 203 has the bar code reading function, the original video signal can be retrieved on the tape T from this print. FIG. 28 illustrates a multiple picture to be printed out in a case where all of data about the number of prints of WD1 to WD4 are "1". The address of the picture such as the time code on the tape is printed in the lower right unit of the contracted picture. If the VTR has a function of retrieving the tape T by using the time code, the original video signal on the tape T can be retrieved similarly.

In the system including the VTR thus constituted, each print picture can be automatically printed after all of the pictures to be printed have been selected. Therefore, the handling facility of the system of this type can be significantly improved.

Furthermore, a picture, which has been once printed, can be again printed by reproducing print data on the tape.

In addition, if the retrieving marks for head-searching are added to a predetermined number of pictures adjacent to the print specified picture, the tape can be run at high speed at the time of retrieving the print specified picture.

Since the frame No. from the start position of the tape can be recorded to the time code in the aforesaid WD0 to WD4, the video signal on the tape T and the recording unit of the PCM-SV can be easily retrieved by using the aforesaid information. If the additional information such as date is not required, it can be omitted by switching off the switch 39.

As described above, the structure according to this embodiment comprises an image signal reproducing unit having an image signal reproducing device and a first digital interface unit for transmitting the reproduction image signal supplied from the reproducing device as digital data, an operation member for retrieving the picture of the reproducing device, a second digital interface unit for supplying control data generated by the operation member to the reproducing device and a printer capable of printing the reproduction image signal supplied from the reproducing device, wherein the operation member is disposed in the printer unit. Therefore, a variety of operations from the printer side can be performed. As a result, searching can be satisfactorily performed even if an exclusive retrieving (switch or the like) member is not provided in the VTR unit. It is significantly effective in a case where it is employed in a camera integrated VTR the size of which has been reduced recently. Furthermore, since the digital interface unit is provided for both the VTR unit and the printer unit, a complicated wiring can be omitted and the connector for connecting the VTR and the printer can be reduced in size and simplified. Therefore, a further satisfactory effect can be obtained in a case where it is employed in a camera integrated VTR.

In addition, the two digital interfaces are connected by means of a sole data bus. Therefore, the wiring can be further simplified and the size of the camera integrated VTR can be significantly reduced.

As described above, according to the present invention, a quick retrieving operation can be performed and the operation facility of the video print system can be improved.

Although a tape-like medium is used according to the aforesaid embodiment, a disc like medium or another shape, such as a solid memory can employed. In addition, although a TV signal is employed as the video signal, the present invention is not limited to this. For example, a still image such as an electronic file may be employed.

The printing means according to this embodiment may be an electronic photography method, a thermal printer and an ink jet method called a "bubble jet method".

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A video print system in which a reproduction apparatus and a print apparatus communicate with each other, wherein said reproduction apparatus comprises:

a compression module, capable of variably setting a compression ratio of image information, for compressing input image information;

a recording module for recording the image information compressed by said compression module, on a recording medium; and a reproduction module for sending the image information from said recording medium, in a compression state, to said print apparatus, wherein said print apparatus comprises:

a storage module for receiving the compressed image information sent by said reproduction module and temporarily storing the received image information;

a decompression module for capturing the compressed image information from said storage module and decompressing the captured image information; and a print module for capturing the image information decompressed by said decompression module and printing out the captured image information, and wherein, in the communication, information concerning whether said print apparatus can perform the printing is sent from said print apparatus to said reproduction apparatus, and, in the case where it is judged that said print apparatus can perform the printing based on the information sent from said print apparatus, image data in the compression state is sent from said reproduction apparatus to said print apparatus, and information concerning completion of the sending of the image information is sent from said print apparatus to said reproduction apparatus.

2. A video print system according to claim 1, wherein said compression module further selects a compression mode.

3. A video print system according to claim 2, wherein one compression mode is DPCM (Differential Pulse Code Modulation).

4. A video print system according to claim 2, wherein one compression mode is JPEG (Joint Photographic Experts Group) compression.

5. A video print system according to claim 1, wherein said reproduction module and said storage module are connected to each other through a data bus to exchange the data.

6. A video print system according to claim 1, wherein print instruction information for a plurality of image data is recorded on the recording medium, and a plurality of images is automatically printed according to the print instruction information.

7. A video print system according to claim 1, wherein said reproduction apparatus includes an input switch to input an instruction for automatically printing a plurality of respectively different images recorded on the recording medium.

8. A video print system in which a reproduction apparatus and a print apparatus communicate with each other, wherein said reproduction apparatus comprises:

a compression module for compressing input image information in a compression state selected from a plurality of compression states;

a recording module for recording the image information compressed by said compression module, on a recording medium; and a reproduction module for sending the reproduced image information from said recording medium, in the compression state, wherein said print apparatus comprises:

a storage module for receiving the compressed image information sent by said reproduction module and temporarily storing the received image information;

a decompression module for capturing the compressed image information from said storage module and decompressing the captured image information; and a print module for capturing the image information decompressed by said decompression module and printing out the captured image information;

and wherein, in the communication, information concerning whether said print apparatus can perform the printing is sent from said print apparatus to said reproduction apparatus, and, in the case where it is judged that said print apparatus can perform the printing based on the information sent from said print apparatus, image data in the compression state and data concerning a data amount of the image data are sent.

9. A video print system according to claim 8, wherein the compression state includes DPCM (Differential Pulse Code Modulation).

10. A video print system according to claim 8, wherein the compression state includes JPEG (Joint Photographic Experts Group) compression.

11. A video print system according to claim 8, wherein said reproduction module and said storage module are connected to each other through a data bus to exchange the data.

12. A video print system according to claim 8, wherein print instruction information for a plurality of image data is recorded on the recording medium, and a plurality of images is automatically printed according to the print instruction information.

13. A video print system according to claim 8, wherein said reproduction apparatus includes an input switch to input an instruction for automatically printing a plurality of respectively different images recorded on the recording medium.

14. A printer, which communicates with an external apparatus including a compression module for compressing input image information, a recording module for recording the image information compressed by said compression module, on a recording medium, and a reproduction module for sending the image information from the recording medium, in a compression state, said printer comprising:

a storage module for receiving the compressed image information sent by said reproduction module and temporarily storing the received image information;

a decompression module for decompressing the image information stored in the storage module; and a print module for printing out the decompressed image information decompressed by said decompression module, wherein, in communication, information concerning whether said printer can perform the printing is sent from said printer to said external apparatus, and, in the case where it is judged that said printer can perform the printing based on the information sent from said printer, image data in the compression state is sent from said external apparatus to said printer, and information concerning completion of the sending of the image information is sent from said printer to said external apparatus.

15. A printer according to claim 14, wherein the compression state includes DPCM (Differential Pulse Code Modulation).

16. A printer according to claim 14, wherein the compression state includes JPEG (Joint Photographic Expert Group) compression.

17. A printer according to claim 14, wherein the external apparatus and said video printer are connected to each other through a data bus to exchange the compressed image information.

18. A printer according to claim 14, wherein print instruction information for a plurality of image data is recorded on the recording medium, and a plurality of images is automatically printed according to the print instruction information.

19. A printer according to claim 14, wherein said external apparatus includes an input switch to input an instruction for automatically printing a plurality of respectively different images recorded on the recording medium.

20. A control method for a printer, which communicates with an external apparatus which executes a compression step of compressing input image information, a recording step of recording the image information compressed in said compression step, on a recording medium, and a reproduction step of sending the image information from the recording medium, in a compression state, said control method for the printer comprising:

a storage step of receiving the compressed image information sent in the reproduction step and temporarily storing the received image information;

a decompression step of decompressing the compressed image information stored in said storage step; and a print step of printing out the decompressed image information decompressed in said decompression step, wherein, in the communication, information concerning whether the printer can perform the printing is sent from the printer to the external apparatus, and, in the case where it is judged that the printer can perform the printing based on the information sent from the printer, image data in the compression state is sent from the external apparatus to the printer, and information concerning completion of the sending of the image information is sent from the printer to the external apparatus.

21. A control method for the printer according to claim 20, wherein the external apparatus and the printer are connected to each other through a data bus to exchange the compressed image information.

22. A control method according to claim 20, wherein print instruction information for a plurality of image data is recorded on the recording medium, and a plurality of images is automatically printed according to the print instruction information.

23. A control method according to claim 20, wherein the reproduction step includes inputting an instruction to automatically print a plurality of respectively different images recorded on the recording medium.

24. An image pickup apparatus, communicating with a print apparatus, said print apparatus comprising a storage module for receiving compressed image information sent from said image pickup apparatus and temporarily storing the received image information, a decompression module for decompressing the compressed image information stored in the storage module, and a print module for printing the image information decompressed by the decompression module, said image pickup apparatus comprising:

an image pickup module;

a compression module for compressing image information in a compression state selected from a plurality of compression states picked up by said image pickup module;

a recording module for recording the image information compressed by said compression module, on a recording medium; and a reproduction module for sending the image information from said recording medium, to said print apparatus in the compression state, wherein, in the communication, information concerning whether said print apparatus can perform the printing is sent from said print apparatus to said image pickup apparatus, and, in the case where it is judged that said print apparatus can perform the printing based on the information sent from said print apparatus, image data in the compression state is sent from said image pickup apparatus to said print apparatus, and information concerning completion of the sending of the image information is sent from said print apparatus to said image pickup apparatus.

25. An apparatus according to claim 24, wherein the print apparatus and said image pickup apparatus are connected to each other through a data bus to exchange the compressed image information.

26. An apparatus according to claim 24, wherein the compression state includes JPEG (Joint Photographic Expert Group) compression.

27. An image pickup apparatus according to claim 24, wherein said print apparatus includes an input switch to input an instruction for automatically printing a plurality of respectively different images recorded on the recording medium.

28. An image pickup apparatus according to claim 24, wherein print instruction information for a plurality of image data is recorded on the recording medium, and a plurality of images is automatically printed according to the print instruction information.

29. A control method for an image pickup apparatus, the image pickup apparatus communicating with a print apparatus having a storage module for receiving compressed image information sent from the image pickup apparatus and temporarily storing the received information, a decompression module for decompressing the compressed image information stored in the storage module, and a print module for printing the image information decompressed by the decompression module, said control method for the image pickup apparatus comprising the steps of:

picking up an image;

compressing image information picked up in said step of picking up an image in a compression state selected from a plurality of compression states;

recording the image information compressed in said compression step, on a recording medium; and sending the image information from the recording medium, to the print apparatus in the compression state, wherein, in the communication, information concerning whether the print apparatus can perform the printing is sent from the print apparatus to the image pickup apparatus, and, in the case where it is judged that the print apparatus can perform the printing based on the information sent from the print apparatus, image data in the compression state is sent from the image pickup apparatus to the print apparatus, and information concerning completion of the sending of the image information is sent from the print apparatus to the image pickup apparatus.

30. A control method according to claim 29, wherein the print apparatus includes an input switch to input an instruction for automatically printing a plurality of respectively different images recorded on the recording medium.

31. A control method according to claim 29, wherein print instruction information for a plurality of image data is recorded on the recording medium, and a plurality of images is automatically printed according to the print instruction information.

32. A print system in which a reproduction apparatus and a print apparatus communicate with each other, wherein said reproduction apparatus comprises:

a compression module capable of variably setting a compression ratio of image information, for compressing input image information;

a recording module for recording the image information compressed by said compression module, on a recording medium; and a reproduction module for sending the image information from the recording medium, in a compression state, to said print apparatus.

wherein said print apparatus comprises:

a storage module for receiving the compressed image information sent by said reproduction module and temporarily storing the received image information;

a decompression module for decompressing the compressed image information stored in said storage module; and a print module for priming the image information decompressed by said decompression module, and wherein, in the communication information concerning whether said print apparatus can perform the printing is sent from said print apparatus to said reproduction apparatus, and, in the case where it is judged that said print apparatus can perform the printing based on the information sent from said print apparatus, image data in the compression state is sent from said reproduction apparatus to said print apparatus, and information concerning completion of the sending of the image information is sent from said print apparatus to said reproduction apparatus.

33. A print system according to claim 32, wherein said compression module selects a compression mode.

34. A print system according to claim 33, wherein one compression mode is DPCM (Differential Pulse Code Modulation).

35. A print system according to claim 33, wherein one compression mode is JPEG (Joint Photographic Experts Group) compression.

36. A print system according to claim 32, wherein said reproduction module and said storage module are connected to each other through a data bus to exchange the data.

37. A print system in which a reproduction apparatus and a print apparatus communicate with each other, wherein said reproduction apparatus comprises:

a compression module for compressing input image information in a compression state selected from a plurality of compression states;

a recording module for recording the image information compressed by said compression module, on a recording medium; and a reproduction module for sending the reproduced image information from the recording medium, in the compression state, wherein said print apparatus comprises:

a storage module for receiving the compressed image information sent by said reproduction module and temporarily storing the received image information;

a decompression module for decompressing the compressed image information stored in said storage module; and a print module for printing the image information decompressed by said decompression module, and wherein, in the communication, information concerning whether said print apparatus can perform the printing is sent from said print apparatus to said reproduction apparatus, and, in the case where it is judged that said print apparatus can perform the printing based on the information sent form said print apparatus, image data in the compression state and data concerning a data amount of the image data are sent.

38. A print system according to claim 37, wherein the compression state includes DPCM (Differential Pulse Code Modulation).

39. A print system according to claim 37, wherein the compression state includes JPEG (Joint Photographic Experts Group) compression.

40. A print system according to claim 37, wherein said reproduction module and said storage module are connected to each other through a data bus to exchange the data.

41. An image pickup apparatus which communicates with a print apparatus comprising:

a compression module for compressing input image information in a compression state selected from a plurality of compression states;

a recording module for recording the image information compressed by said compression module, on a recording medium; and a reproduction module for sending the reproduced image information from said recording medium, in the compression state, wherein said print apparatus includes:

a storage module for receiving the compressed image information sent by said reproduction module and temporarily storing the received image information, a decompression module for decompressing the compressed image information stored by said storage module, and a print module for printing the image information decompressed by said decompression module, and wherein, in the communication, information concerning whether said print module can perform the printing is sent, and, in the case where it is judged that said print module can perform the printing base on the information sent from said print apparatus, image data in the compression state and data concerning a data amount of the image data are sent.

42. An image pickup apparatus according to claim 41, wherein the compression state includes DPCM (Differential Pulse Code Modulation).

43. An image pickup apparatus according to claim 41, wherein the compression state includes JPEG (Joint Photographic Experts Group) compression.

44. An image pickup apparatus according to claim 41, wherein said image pickup apparatus and said reproduction apparatus are connected to each other through a data bus to exchange the data.

45. A control method for an image pickup apparatus which communicates with a print apparatus comprising:

a compression step for compressing input image information in a compression state selected from a plurality of compression states;

a recording step for recording the image information compressed in said compression step, on a recording medium; and a reproduction step for sending the reproduced image information from said recording step, in the compression state, wherein the print apparatus includes:

a storage module for receiving the compressed image information sent in said reproduction step and temporarily storing the received image information;

a decompression module for decompressing the compressed image information stored in the storage module; and a print module for printing the image information decompressed in the decompression module, and wherein, in the communication, information concerning whether the print module can perform the printing is sent, and, in the case where it is judged that the print module can perform the printing based on the information sent from the print apparatus, image data in the compression state and data concerning a data amount of the image data are sent.

46. A method according to claim 45, wherein the compression state includes DPCM (Differential Pulse Code Modulation).

47. A method according to claim 45, wherein the compression state includes JPEG (Joint Photographic Experts Group) compression.

48. A method according to claim 45, wherein the image pickup apparatus and the print apparatus are connected to each other through a data bust to exchange the data.

49. A printer which communicates with a reproduction apparatus including a compression module for compression input image information in a compression state selected from a plurality of compressing states, a recording module for recording the image information compressed by said compression module, on a recording medium, and a reproduction module for sending the reproduced image information from the recording medium, in the compression state, said printer comprising:

a storage module for receiving the compressed image information sent by said reproduction module and temporarily storing the received image information;

a decompression module for decompressing the compressed image information stored in said storage module; and a print module for printing the image information decompressed by said decompression module, wherein, in the communication, information concerning whether said printer can perform the printing is sent from said printer to said reproduction apparatus, and, in the case where it is judged that said printer can perform the printing based on the information sent from said printer, image data in the compression sate and data concerning a data amount of the image data are sent.

50. A printer according to claim 49, wherein the compression state includes DPCM (Differential Pulse Code Modulation).

51. A printer according to claim 49, wherein the compression state includes JPEG (Joint Photographic Experts Group) compression.

52. A printer according to claim 49, wherein said printer and said reproduction apparatus are connected to each other through a data bus to exchange the data.

53. A control method for a printer which communicates with a reproduction apparatus including a compression module for compressing input image information in a compression state selected from a plurality of compression states, a recording module for recording the image information compressed by the compression module, on a recording medium, and a reproduction module for sending the reproduced image information from the recording medium, in the compression state, said control method for the printer comprising:

a storage step for receiving the compressed image information sent by the reproduction module and temporarily storing the received image information;

a decompression step for decompressing the compressed image information stored in said storage step; and a print step for printing the image information decompressed in said decompression step, wherein, in the communication, information concerning whether the printer can perform the printing is sent from the printer to the reproduction apparatus, and, in the case where it is judged that the printer can perform the printing based on the information sent from the printer, image data in the compression state and data concerning a data amount of the image data are sent.

54. A method according to claim 53, wherein the compression state includes DPCM (Differential Pulse Code Modulation).

55. A method according to claim 53, wherein the compression state includes JPEG (Joint Photographic Experts Group) compression.

56. A method according to claim 53, wherein the printer and the reproduction apparatus are connected to each other through a data bus to exchange the data.

* * * * *

UNITED STATES PATENT AND TRADEMARK OFFICE
CERTIFICATE OF CORRECTION

PATENT NO. : 6,674,538 B2
DATED : January 6, 2004
INVENTOR(S) : Koji Takahashi

It is certified that error appears in the above-identified patent and that said Letters Patent is hereby corrected as shown below:

Title page,
Item [*] please insert -- This patent issued on a continued prosecution application filed under 37 C.F.R. 1.53(d), and is subject to the twenty year patent term provision of 35 U.S.C. 154(a)(2). --

Column 2,
Line 16, “are printed” should read -- is printed --.

Column 3,
Line 9, “2A-2C” should read -- 2A-2C, --;
Line 13, “3B” should read -- 3B, --;
Line 17, “on to” should read -- on --;
Line 54, “19B” should read -- 19B, --; and
Line 58, “20B” should read -- 20B, --.

Column 6,
Lines 52 and 61, “cam coder” should read -- camcorder --; and

Column 7,
Line 3, “cam coder” should read -- camcorder --; and
Line 7, “at need” should read -- as needed --.

Column 8,
Lines 5 and 20, “cam coder” should read -- camcorder --;
Line 22, “at need.” should read -- as needed. --.

Column 9,
Line 3, “is’ should be deleted;
Line 55, “cam coder” should read -- camcorder --;
Line 56, “returning” should read -- it returns --; and
Line 57, “waiting” should read -- waits --.

Column 10,
Line 18, “cam coder” should read -- camcorder --.

Column 11,
Line 8, “image” should read -- images --.

UNITED STATES PATENT AND TRADEMARK OFFICE

CERTIFICATE OF CORRECTION

PATENT NO. : 6,674,538 B2
DATED : January 6, 2004
INVENTOR(S) : Koji Takahashi

It is certified that error appears in the above-identified patent and that said Letters Patent is hereby corrected as shown below:

<u>Column 13</u>,
Line 1, "the" should read -- if the --; and
Line 12, "similarly" should read -- similar --.

<u>Column 16</u>,
Line 55, "0 REWIDE" should read -- 0 REWIND --;
Line 65, "ASLOW" should read -- A SLOW --; and
Line 66, "BPLAY" should read -- B PLAY --.

<u>Column 26</u>,
Line 62, "module" should read -- module, --.

<u>Column 27</u>,
Line 13, "communication" should read -- communication, --; and
Line 61, "form" should read -- from --.

<u>Column 29</u>,
Line 13, "bust" should read -- bus --.

Signed and Sealed this

Twelfth Day of October, 2004

JON W. DUDAS
*Director of the United States Patent and Trademark Office*